United States Patent [19]

Teicher

[11] Patent Number: 5,728,999

[45] Date of Patent: Mar. 17, 1998

[54] VENDING MACHINE, A VENDING SYSTEM AND METHODS FOR OPERATING SAME

[75] Inventor: Mordechai Teicher, Kfar Saba, Israel

[73] Assignee: Advanced Retail Systems Ltd., Kiriat Ono, Israel

[21] Appl. No.: 476,548

[22] Filed: Jun. 6, 1995

[30] Foreign Application Priority Data

| Jun. 14, 1994 | [IL] | Israel | 110017 |
| Sep. 25, 1994 | [IL] | Israel | 111055 |
| Jun. 1, 1995 | [IL] | Israel | 113980 |

[51] Int. Cl.⁶ .................. G06K 5/00; G06F 7/08
[52] U.S. Cl. ........................ 235/381; 235/380
[58] Field of Search ..................... 235/381, 380

[56] References Cited

U.S. PATENT DOCUMENTS

| 3,716,697 | 2/1973 | Weir . | |
| 3,786,421 | 1/1974 | Wostl et al. . | |
| 4,108,363 | 8/1978 | Susumu | 235/383 |
| 4,395,627 | 7/1983 | Barker et al. | 235/381 |
| 4,553,211 | 11/1985 | Kawasaki et al. | 364/479 |
| 4,629,090 | 12/1986 | Harris et al. | 221/7 |
| 4,791,411 | 12/1988 | Staar | 340/568 |
| 4,859,837 | 8/1989 | Halpern | 235/492 |
| 4,866,661 | 9/1989 | de Prins | 364/900 |
| 4,893,705 | 1/1990 | Brown | 194/211 |
| 4,906,828 | 3/1990 | Halpern | 235/492 |
| 5,133,441 | 7/1992 | Brown | 194/211 |
| 5,206,488 | 4/1993 | Teicher | 235/381 |
| 5,327,066 | 7/1994 | Smith | 235/381 |
| 5,352,876 | 10/1994 | Watanabe et al. | 235/381 |
| 5,451,758 | 9/1995 | Jesndanont | 235/384 |

FOREIGN PATENT DOCUMENTS

| 52-53499 | 4/1977 | Japan . | |
| 2222714 | 3/1990 | United Kingdom | 235/381 |

*Primary Examiner*—Donald T. Hajec
*Assistant Examiner*—Douglas X. Rodriguez
*Attorney, Agent, or Firm*—Skjerven, Morrill, MacPherson, Franklin & Friel

[57] ABSTRACT

A vending machine for serving a plurality of customers, each having a payment card, which includes a vending unit for storing and displaying an accessible inventory and for selectively enabling and barring free access of a customer to a plurality of items therefrom, a card payment unit which upon receipt of a payment card from a customer, validates, prior to said enabling, that the payment card can be charged for the value of the accessible inventory, and which charges, after the barring, the payment card with a sum in accordance with the items removed from the accessible inventory by the customer and a control unit for coordinating the operations of said vending unit and said card payment unit.

16 Claims, 16 Drawing Sheets

FIG. 3A  FIG. 3B

VENDING MACHINE, A VENDING SYSTEM AND METHODS FOR OPERATING SAME

FIELD OF THE INVENTION

The present invention relates to vending machines generally, and more particularly to a vending machine which allows free access to a variety of articles stored therein and which charges the customer upon the completion of a purchase for the articles removed therefrom.

BACKGROUND OF THE INVENTION

Vending machines for selling merchandise, such as cans of soft drinks, are well known in the art. Generally speaking, conventional vending machines include a vending unit, a payment unit and a control unit for coordinating therebetween.

Typically, the vending unit includes a storage unit for storing an inventory of articles to be vended and a dispensing unit for dispensing the purchased article. Alternatively, the dispensing unit may be replaced by a unit which provides selective access to a preselected article, such as described in U.S. Pat. Nos. 4,893,705 and 5,133,441, both to Brown.

In prior art vending machines, purchasing an item typically involves the following four operations:

1. depositing a sum of money using either cash or a payment card;
2. selecting an item to be purchased by employing a mechanical lever, a keypad or a touch screen;
3. receiving the purchased item vended by a dispensing unit or receiving selective access to the preselected item; and
4. retrieving change for the unused portion of the deposited cash sum or the payment card.

Prior art vending machines are deficient in many respects, a few of which are listed below.

Generally, they do not allow free access to the articles on sale. Further, conventional dispensing mechanisms complicate the machine's design while limiting the available storage volume. Moreover, most dispensing mechanisms are designed for a specific product range, for example, beverage cans and snack bags usually require different dispensing mechanisms.

Whereas vending machines do not provide free access to a plurality of items at the customer choice, there are known in the art self service systems, such as a supermarket or hotel minibars, which provide free access to a plurality of products. U.S. Pat. Nos. 3,716,697 to Weir and 4,108,363 to Susumu describe a supermarket in which the removal of a merchandise article from a shelf is sensed by weight calculations. A personal customer card is used with the removal of each article, to associate the article with the respective customer. The customer pays for the removed items at the supermarket's checkout by presenting the personal customer card to the cashier. It will be appreciated that the customer may pay the cashier with any acceptable monetary instrument.

Susumu also describes a vending machine within the supermarket which provides free access to a variety of goods on sale. A coin is deposited and the customer is free to remove items from the vending machine as long as their total value does not exceed that of the deposited coin. When the customer removes an item which causes the total value to exceed the value of the deposited coin, an alarm sounds to call for the intervention of a human attendant.

U.S. Pat. Nos. 4,553,211 to Kawasaki et al, 4,629,090 to Harris et al and 4,791,411 to Staar describe hotel room minibars, with various arrangements to detect the removal of articles and transmit this information to the hotel's computer for record-keeping. Payment is made by the hotel guest to the cashier, typically during the checkout procedure.

A drawback of prior art free access self service systems is that an attendant must be involved in the purchase process. In hotel minibars and supermarkets, checkout is done at the cashier whereas Susumu's coin operated machine assumes the intervention of a human attendant in case a purchase exceeds the coin's value.

A particular prior art free access vending machine in which a human attendant does not supervise the purchase process is that of the newspaper box. However, this is inherently a single item system and therefore the attendance of a human attendant is not required since an implicit assumption is made that most customers will find no interest in removing more than a single newspaper copy per purchase.

SUMMARY OF THE INVENTION

An important object of the present invention is to provide a vending machine which offers a plurality of customers free access to a variety of items and in which the removal of items from the vending machine and the charging therefore, may be completed without assuming the presence of a human attendant.

According to one aspect of the present invention, the vending machine provides free access to a variety of articles in the accessible inventory during purchase, thereby enabling the customer to select and remove the number and type of articles of his choice.

According to one preferred embodiment of the present invention, the accessible inventory includes the entire inventory of the vending machine.

In accordance with an alternative embodiment of the present invention, the accessible inventory is part of the entire inventory of the vending machine.

According to one aspect of the present invention, the vending machine includes a card payment system capable of the following:

A. validating, prior to the onset of a purchase, that the customer may be charged for the value of the entire inventory to which the customer has access during purchase. This inventory is also termed herein the accessible inventory; and
B. charging the customer upon the purchase completion, in accordance with the items he has removed from the accessible inventory.

According to another aspect of the present invention, the vending machine employs a card payment unit which interacts with at least one of the following payment cards as defined hereinbelow:

A. An electronic checkbook—This is a credit card and/or a bank debit card. It is a payment card which bears information identifying a remote credit account or bank account and authorizing transactions therefrom. A payment with an electronic checkbook is executed actually between the customer's remote account and the merchant's account, i.e. the vending machine owner's remote account, and is therefore associated with relatively costly procedures of communication, authorization, accounting and reporting which are well known.
B. A combo smart card—This payment card includes both an electronic checkbook and an electronic purse. The electronic purse is a rechargeable stored-value card in which value is added to the electronic purse via purse replenishment transactions and subtracted therefrom by using it for payment. In a combo smart card the electronic purse may be replenished by charging the respective credit or bank account via the electronic checkbook part of the same card.

C. A local account card—This is a personal payment card which identifies and authorizes transactions with a customer account in a database of accounts managed in a local computer.

According to one preferred embodiment of the present invention, the card payment unit operates with a combo smart card and includes a transaction selector which selects whether to charge the customer from the electronic purse or his remote bank or credit account via the electronic checkbook, or whether to replenish the electronic purse via the electronic checkbook before charging the electronic purse.

According to another preferred embodiment of the present invention, the card payment unit operates with an electronic checkbook which is also linked to a local account, or with a local account card which is also linked to a remote bank or credit account. The card payment unit is linked with a local computer which includes a transaction selector for selecting whether to charge the customer's local account or remote account or whether to replenish the local account from the remote account before charging the local account.

According to a preferred embodiment of the present invention, the local computer forms part of the vending machine. Alternatively, it may communicate with a number of vending machines.

A preferred method of operating the vending machine of the present invention includes the following steps:

A. The customer introduces his payment card to the card payment unit;
B. The payment card is checked for validity with respect to a maximal possible purchase value, the maximal possible purchase value being the value of the accessible inventory;
C. Upon validation, the customer receives free access to the accessible inventory and removes any number of items therefrom, the removal is being recorded by the vending machine; and
D. Upon purchase completion, the customer is being charged in accordance with the items he purchased by removal.

There is thus provided, in accordance with a preferred embodiment of the present invention, a vending machine serving a plurality of customers, each having a payment card, which includes a vending unit for storing and displaying an accessible inventory and for selectively enabling and barring free access of a customer to a plurality of items therefrom, a card payment unit which upon receipt of a payment card from a customer, validates, prior to the enabling, that the payment card can be charged for the value of the accessible inventory, and which charges, after the barring, the payment card with a sum in accordance with the items removed from the accessible inventory by the customer and a control unit for coordinating the operations of the vending unit and the card payment unit.

Further, according to a preferred embodiment of the present invention, the vending unit includes a storage and display unit having therein the accessible inventory, an access control unit for enabling and barring the free access of the customer to the storage and display unit and a purchase sensing unit for sensing the removal of each item from the accessible inventory stored in the storage and display unit.

The purchase sensing unit may be selected from the group consisting of a plurality of position sensing elements, a plurality of weight sensing elements, a pattern sensing element and any combination therebetween.

The access control unit may include a door with a locking mechanism for selectively barring and enabling access to the storage and display unit.

Additionally, the storage and display unit may have therein an inaccessible inventory of a second plurality of items, the access control unit further includes an inventory splitting unit for barring access to the second plurality of items of the inaccessible inventory.

Also, the inventory splitting unit may operate to selectively replenish the accessible inventory with items from the inaccessible inventory.

Further, the card payment unit includes a transaction selector which automatically selects whether to charge the customer from a local account, from a remote account or whether to replenish the local account from the remote account and to charge the customer from the local account thereafter.

According to one preferred embodiment of the present invention, the payment card is a combo smart card, the local account is charged from an electronic purse of the combo smart card and the remote account is charged via an electronic checkbook of the combo smart card.

Further, the card payment unit includes an electronic checkbook payment unit for executing electronic checkbook transactions, an electronic purse payment unit for executing electronic purse transactions and an electronic purse replenishment unit for replenishing the electronic purse from the remote account via the electronic checkbook.

In accordance with an alternative preferred embodiment of the present invention, the card payment unit includes a local computer for managing the local account and wherein the payment card, when presented at the card payment unit, identifies and authorizes transactions with both the respective account in the local computer and a remote account, the remote account being a bank account or a credit account.

Further, the card payment unit includes a remote account payment unit for executing transactions charged to the remote account, a local account payment unit for executing a local account transaction and a local account replenishment unit for replenishing the local account from the remote account.

There is also provided, in accordance with a preferred embodiment of the present invention, a vending system which includes:

a) at least two vending machines, each operating for serving a plurality of customers, each customer having a payment card, including:

a vending unit for selectively enabling and barring free access of a customer to a plurality of items from an accessible inventory stored therein;

a card payment unit which upon receipt of a payment card from a customer, communicates with a local computer; and a control unit for coordinating the operations of the vending unit and the card payment unit; and b) a local computer communicating with the card payment unit of each of the at least two vending machines for validating, prior to the enabling at a respective vending machine, that the payment card can be charged for the value of the accessible inventory and for charging, after the barring at the respective vending machine, the payment card with a sum in accordance with the items removed from the accessible inventory of the respective vending machine.

Further, the local computer includes a transaction selector which selects automatically, for each purchase in any of the at least two vending machines, whether to charge the customer from a local account of the customer managed within the computer, from a remote account of the customer, or whether to replenish the local account from the remote account and to charge the customer from the local account thereafter.

There is also provided, according to a preferred embodiment of the present invention, a method of operating a vending machine for a plurality of customers each having a payment card, the vending machine having a vending unit for selectively enabling and barring free access to a plurality of items from an accessible inventory stored therein, a card payment unit and a control unit for coordinating the operations of the vending unit and the card payment unit, the method includes the following steps:
a) introducing the payment card in the card payment unit;
b) validating whether the payment card can be charged for the value of the accessible inventory;
c) upon successful validation of the payment card, enabling free access of the customer to the plurality of items stored in the vending unit;
d) sensing and recording each item as removed from the accessible inventory;
e) barring, upon indication from the customer, the free access; and charging the payment card for the value of the items removed from the vending unit.

Further, the method may also include the step of sensing the removal of an item by sensing one of the group consisting of the item weight, the item position, the item pattern and any combination therebetween.

Still further, the vending unit also operates for storing an inaccessible inventory of items, and the method further includes the step of selectively replenish the accessible inventory by items from the inaccessible inventory.

Additionally, the method may include the step of selecting automatically whether to charge the payment card from a local account, from a remote account or whether to replenish the local account from the remote account and to charge the payment card from the local account thereafter.

According to a preferred embodiment of the present invention, the payment card is a combo smart card and the local account is the electronic purse of the combo smart card, and the method further includes charging the remote account via the electronic checkbook of the combo smart card.

Alternatively, the payment card may be an electronic checkbook or a local account card.

BRIEF DESCRIPTION OF THE DRAWINGS

The present invention will be understood and appreciated more fully from the following detailed description taken in conjunction with the appended drawings in which:

FIGS. 3A–3C are schematic pictorial illustrations of a vending machine, constructed according to one preferred embodiment of the present invention;

DETAILED DESCRIPTION OF THE PRESENT INVENTION

Figure 1:
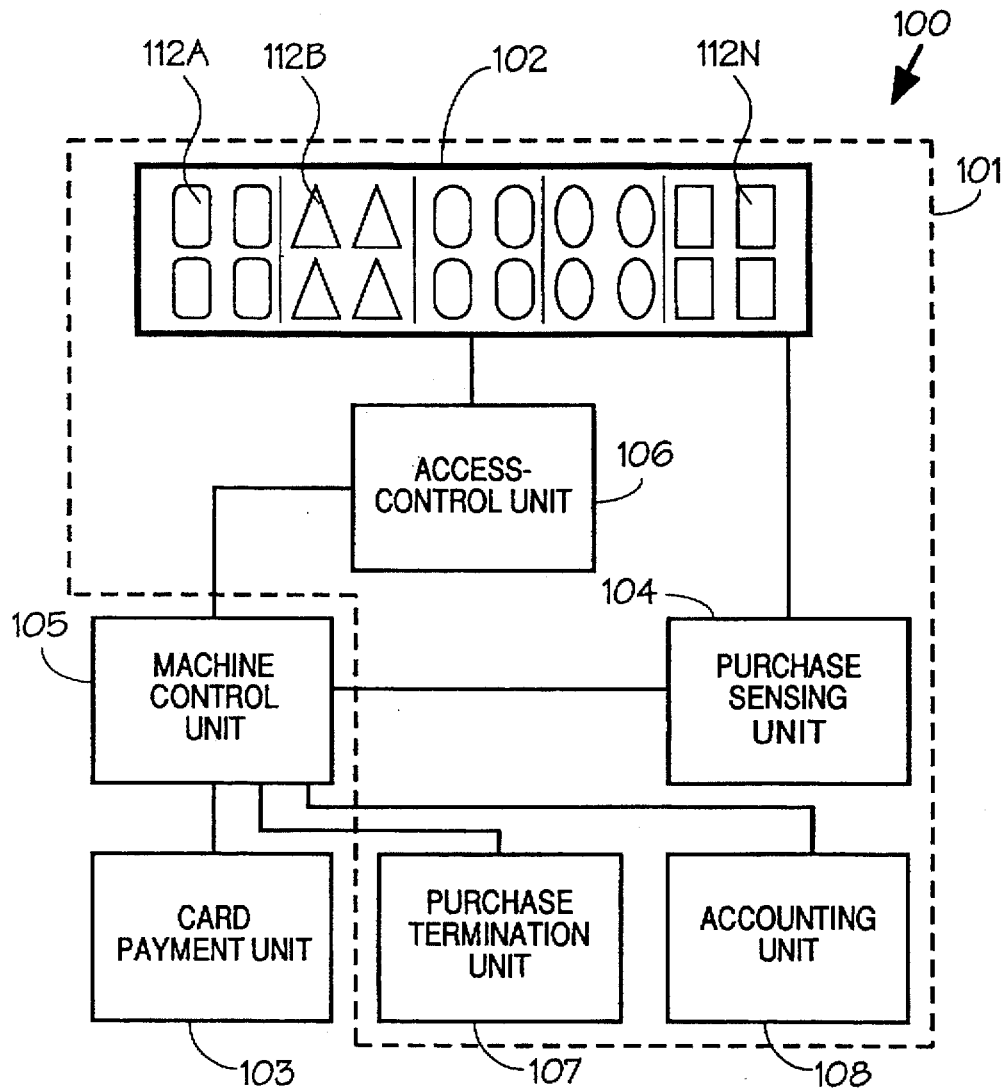
FIG. 1 is a schematic block diagram illustration of a vending machine, constructed in accordance with a preferred embodiment of the present invention.

Reference is now made to FIG. 1 which is a schematic block diagram of a vending machine, generally referenced 100, constructed in accordance with a preferred embodiment of the present invention.

The vending machine 100 preferably comprises a vending unit 101 for storing, displaying and accounting for items to be purchased, a card payment unit 103 operative with a combo smart card, an electronic checkbook or a local account card, for checking before the onset of purchase whether the payment card is valid with respect to the maximal possible purchase value and for charging the customer via the payment card in accordance with the items removed from the vending unit, and a control unit 105 for controlling the operations of the vending unit 101 and the card payment unit 103.

The vending unit 101 preferably comprises a storage and display unit 102 accommodating an inventory of a plurality of various articles offered for sale of which three are referenced 112A, 112B and 112N, an access-control unit 106 for enabling and barring access to the storage and display unit 102, a purchase sensing unit 104 for detecting and identifying articles removed by the customer from the storage and display unit 102, a purchase termination unit 107 for indicating that a purchase has been concluded and an accounting unit 108 which calculates the total price of the articles purchased.

It will be appreciated that the vending unit 101 is of the type which enables the customer free access to the articles on sale in an accessible inventory during purchase.

The access-control unit 106 comprises any suitable means for enabling and barring access to the storage and display unit 102. In the embodiments described herein, the access control unit comprises a glass door, manually or electrically driven, and a lock (FIG. 3A).

In addition, the access control unit 106 may include an inventory splitting unit, described in detail with reference to FIGS. 4A–5C hereinbelow, which preferably physically divides the storage and display unit 102 into an accessible inventory and an inaccessible inventory.

The purchase termination unit 107 preferably comprises a sensor for confirming the re-locking of the door of the access-control unit 106 after a purchase is terminated.

The card payment unit 103 is capable of receiving a customer personal payment card and of charging him, via the payment card, any sum between zero and the maximal possible purchase value, which is the value of the items in the accessible inventory.

The control unit 105 preferably comprises a central processing unit (not shown) and the suitable applications and drivers for coordinating the operation of the vending unit 101 and the card payment unit 103.

The operation of the vending machine 100 is preferably controlled by the control unit 105 as follows:

A. The preferred default state of the vending machine 100 is that the access-control unit 106 bars the customer's access to the articles offered for sale in the storage and display means 102;

B. When a payment card is received in the card payment unit 103 it is checked for its validity and if approved, the access-control unit 106 is activated to allow the customer free access to the accessible inventory of the storage and display unit 102.

The customer removes any number of the articles offered for sale from the storage and display unit 102;

C. Each article removed by the customer is sensed by the purchase sensing unit 104 and the removal is recorded by the accounting unit 108.

D. Once the customer finishes to remove items from the storage and display unit 102, he actuates the purchase termination unit 107, for example by closing a door of unit 102. The purchase termination unit 107 transmits an indication that the purchase is completed to the accounting unit 108 which calculates the sum to be paid, and ensures that the access-control unit 106 returns to its state in which it bars access to the storage and display unit 102.

Figure 2:
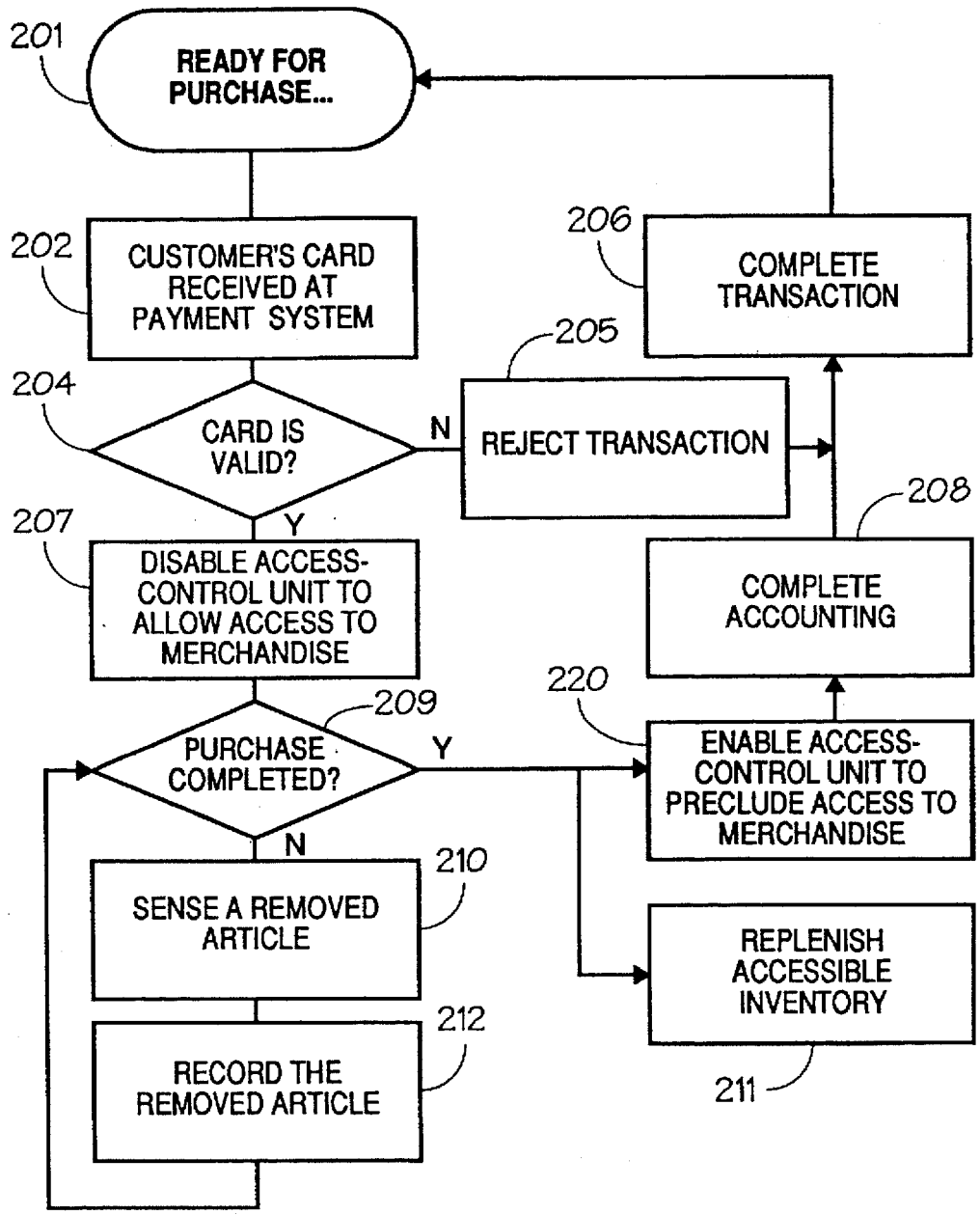
FIG. 2 is a schematic flow chart illustration of the purchase procedures employed when using the vending machine of the FIG. 1.

Reference is now made to FIG. 2 which is a schematic flow chart illustration of a preferred operation procedure of the vending machine 100.

Block 201 indicates the vending machine 100 in an idle state, ready for use. A customer wishing to use the vending machine 100, first introduces his payment card, as indicated by block 202, at the card payment unit 103. Next, as shown in block 204 the payment card is checked for validity, to check in advance that payment of any sum between zero and the maximal possible purchase value is reasonably guaranteed.

It is a particular feature of the present invention that the vending machine 100 includes a card payment unit 103 which checks in advance that the payment card it interfaces with may be charged for any sum between zero and the maximal possible purchase value as described in detail with reference to FIGS. 10A–11C hereinbelow.

If the payment card is found to be valid in the step indicated by block 204, the access-control unit 106 is activated to allow free access, as indicated by block 207, to the accessible inventory of the storage and display unit 102. If the payment card is found invalid for any reason, the transaction is rejected at block 205, the transaction is completed with no payment as indicated in block 106, and the machine idles again at 201.

If the payment card is found valid, the machine is waiting until an article is removed by the customer, which is sensed by the sensing unit 104 as indicated by block 210 and the purchase is recorded by the accounting unit 108 as indicated by block 212.

It will be appreciated that unlike conventional prior art vending machines, the customer is allowed to remove any number of articles during purchase, even until the entire accessible inventory is consumed, since the card payment unit 103 ensures, in advance, that the customer's payment card can be charged for any purchase.

Upon purchase termination as shown by block 209, the control unit 105 activates the access-control unit 106 to preclude the customer from further access to the articles stored in the storage and display unit 102 (block 220).

In addition, if the inventory in the storage and display unit 102 is divided into an accessible inventory and an inaccessible inventory by a suitable splitting unit, items may be replenished from the inaccessible inventory to the accessible inventory as indicated by block 211.

Then, as indicated by block 208, the sum to be paid for the purchase is charged via the customer's payment card as provided by the accounting unit 108. This sum typically, but not necessarily, equals to the arithmetic total sum of prices of the items previously recorded by the accounting unit 108 and indicated by block 212. In case that a discount of any type, such as purchase 2 and get 1 free, is provided the sum to be charged may be smaller than the total of the sums recorded by the accounting unit 108.

The customer is then charged as described in detail with reference to FIGS. 10A–11C and after the transaction is completed as indicated by block 206, the vending machine 100 returns to its idle state 201.

Figure 3C:
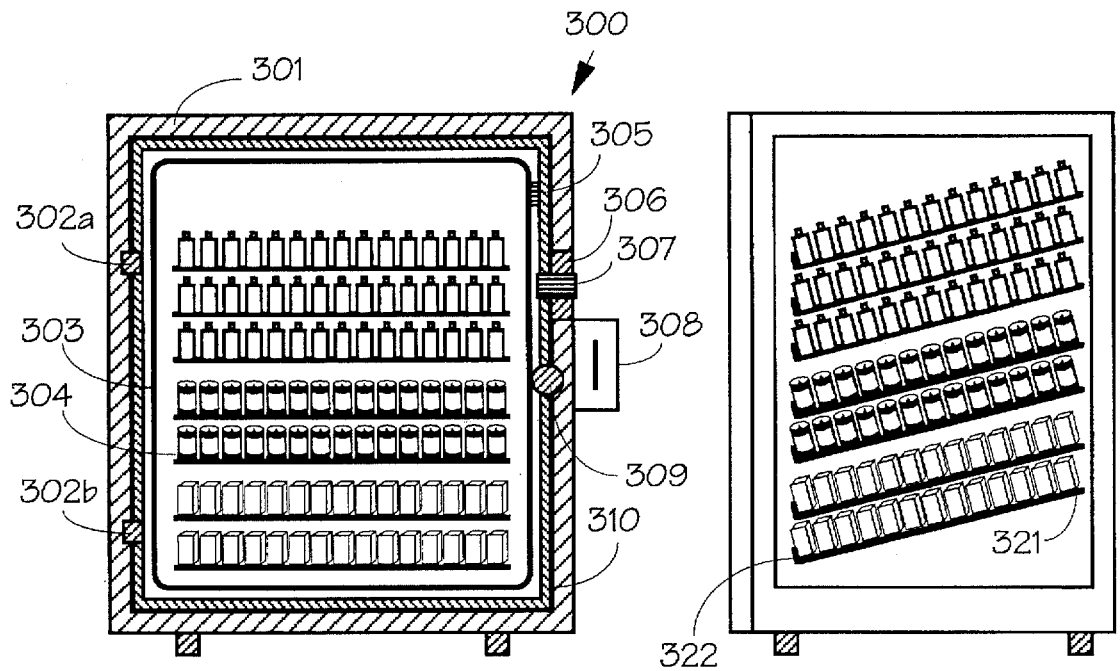
Figure 3C:
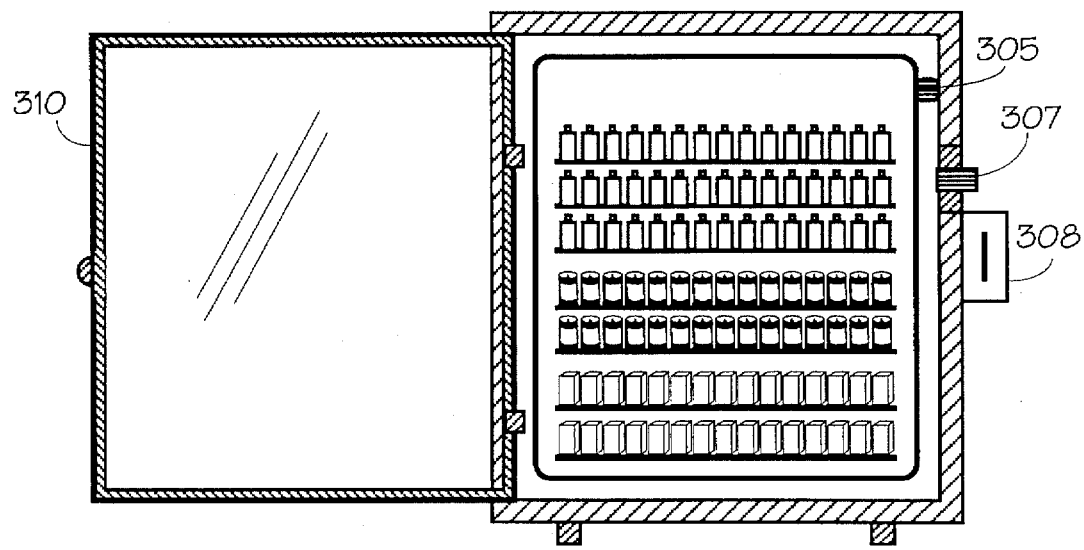

Reference is now made to FIGS. 3A–3C which are schematic pictorial illustrations of a vending machine, generally referenced 300. The vending machine 300 is a non limiting pictorial example of the vending machine 100 in accordance with a preferred embodiment of the present invention.

FIG. 3A is a front view of the vending machine 300, FIG. 3B is a side view thereof and FIG. 3C is a front view of the vending machine 300 during purchase.

The vending machine 300 preferably comprises a three dimensional chamber 301 of which one side is open. The chamber 301 includes therein a storage and display unit 303 which includes a plurality of articles for sale of which one is referenced 304.

The chamber 301 is preferably closed by a glass door 310, thereby enabling a potential customer to view the items offered for sale by the vending machine 300. In the illustrated embodiment, the glass door 310 is hung on hinges 302A and 302B and is locked by a bolt 307 and a lock 306. A sensor 305 confirms that the door is closed, for example when a purchase is completed.

The system 300 preferably also comprises a card payment unit 308 which operates similarly to the card payment unit 103 with any suitable payment card as described in detail with respect to FIGS. 10A–11C hereinbelow.

When a payment card is inserted into the card reader 308, its validity is checked and if approved the bolt 307 is released to allow the user to open the door 310 by pulling its handle 309. As seen in FIG. 3C, once the door is opened, the customer has free access to a plurality of items on sale and can remove articles from the storage and display unit 303 as he desires. The removal of each article is sensed by a sensor and recorded as described in detail hereinabove with reference to FIGS. 1 and 2.

As best seen in FIG. 3B, the shelves on which the items for sale are located, such as shelf 321 are inclined to facilitate the removal of articles from the storage and display unit 303. In the illustrated embodiment, as each article is removed from the front row, it is being replenished by an item from a successive row by gravity, the replenishing item is being stopped by stopper 322.

When a purchase is completed, the customer closes the door. The sensor 305 senses that the door has been closed and actuates the bolt 307 while confirming that the door is closed and providing an indication to this effect to the accounting unit (not shown). The accounting unit which is similar to the accounting unit 108 completes the accounting procedure, the customer is charged via his payment card and an indication is provided to the card payment unit 308 that the payment card may be returned to the customer.

Figure 4A:
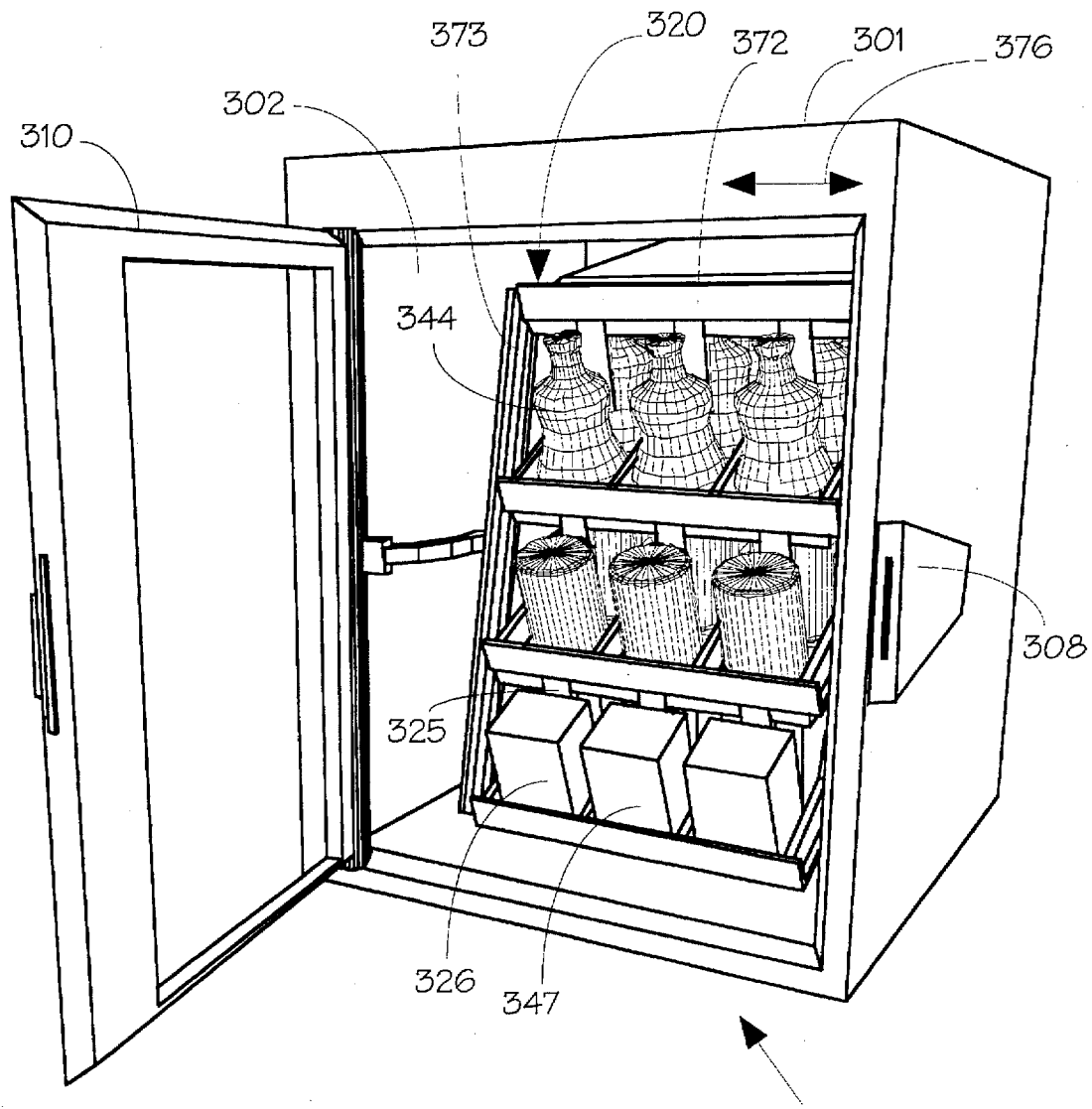
FIGS. 4A–4C are schematic pictorial illustrations of the vending machine of FIGS. 3A–3C including an inventory splitting unit which divides the inventory of articles in the vending machine to an accessible inventory and an inaccessible inventory.
Figure 4B:
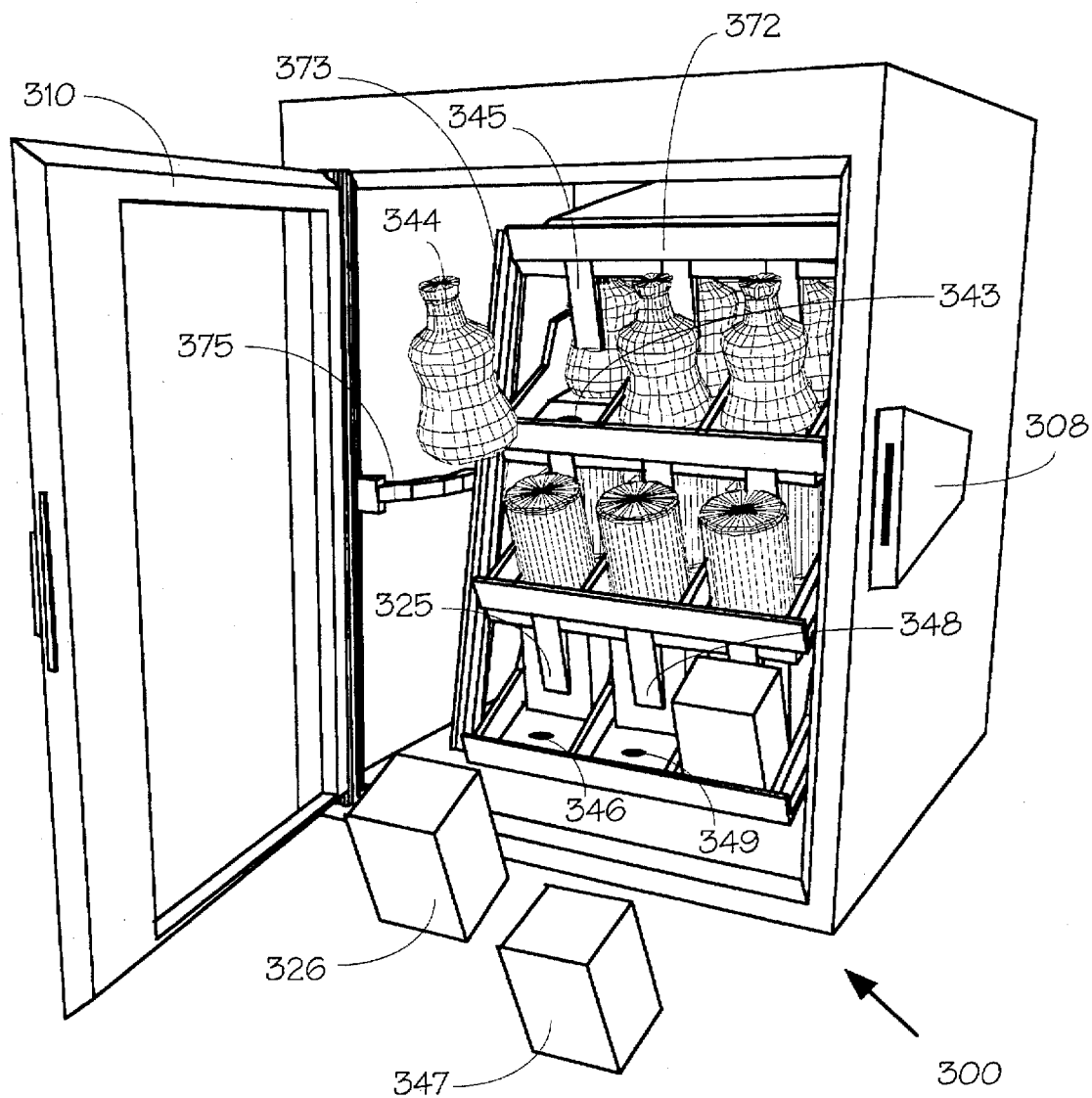
Figure 4C:
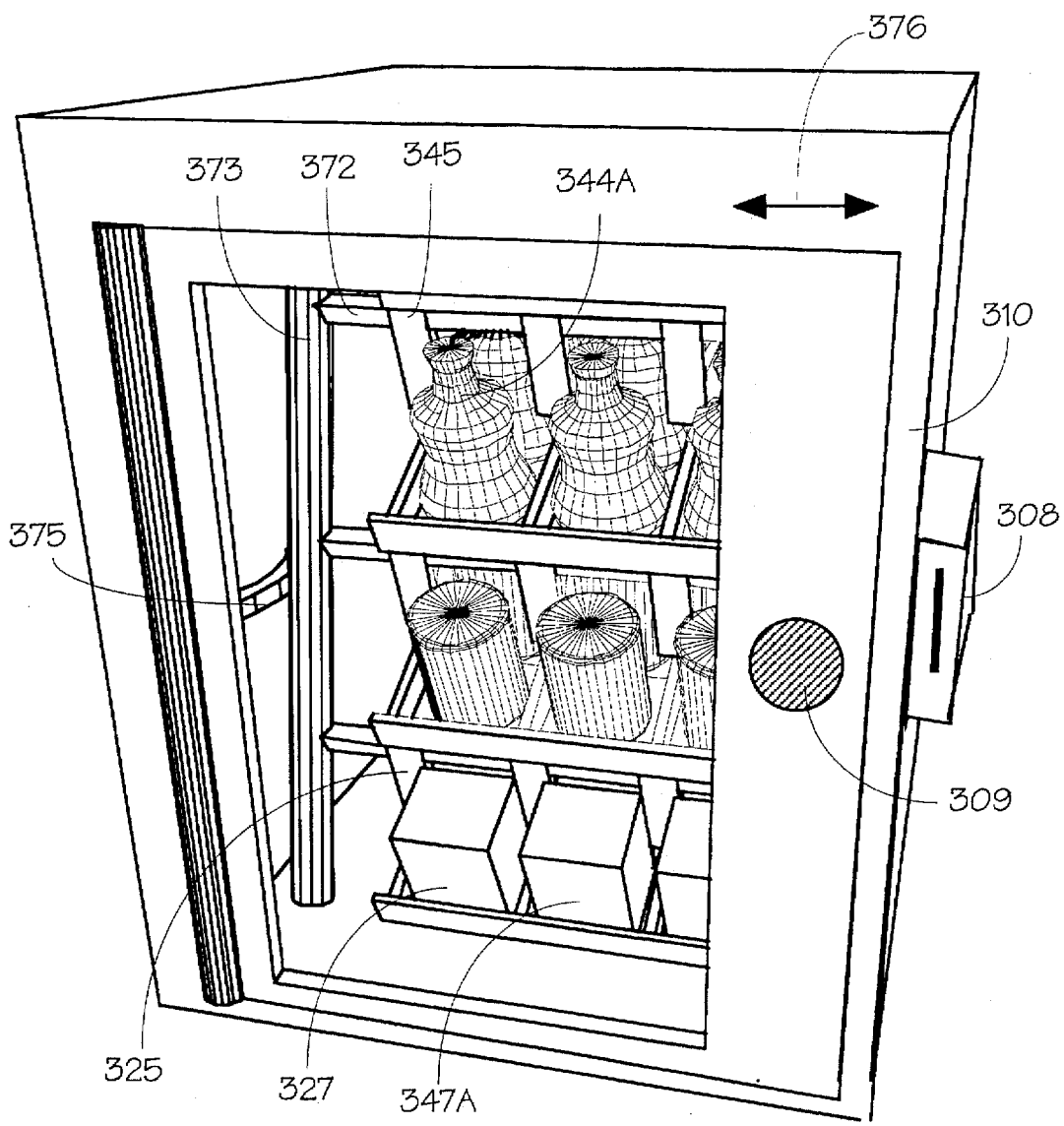

Reference is now made to FIGS. 4A–4C which are pictorial illustrations of the vending machine 300 including an inventory splitting unit 320 which divides the storage and display unit 303 into an accessible inventory which includes items which may be removed by the customer during purchase, and to an inaccessible inventory.

For simplicity of illustration, FIGS. 4A–4C include a limited number of items in the storage and display unit 303. FIG. 4A and 4B illustrate the vending machine 300 during purchase and FIG. 4C after a purchase has been completed.

As best seen in FIG. 4B, the inventory splitting unit 320 preferably comprises a plurality of separating members, such as separating members 325, 345 and 348, connected via horizontal bars, such as bar 372 to a movable vertical bar 373. The vertical bar 375 is connected via a connection member 375 to the door 310 of the vending machine 300.

When the door 310 is opened, as shown in FIGS. 4A and 4B, the separating members, such as the separating member 325 separate between the first and second rows of items, thereby the customer has free access only to the first row of items.

In addition (FIG. 4B), once the articles referenced 326, 344 and 347 have been removed by the customer from the first row, the separating members 325, 345 and 348 prevent the replenishment of the spaces from which these items have been removed by items from the second row.

The removal of each item is sensed by any suitable sensor, such as the sensor described with reference to FIGS. 6A–6C hereinbelow. Preferably, but not necessarily, the vending machine 300 includes one sensor for each item location at the first row, such as the sensors 343, 346 and 349.

As best seen in FIG. 4C, between purchases, the door 310 is closed to effect via the connection member 375, horizontal shift of vertical bar 373 indicated by arrow 376. This horizontal movement positions the separating members, such as the separating members 325 and 345 in an offset with the items to allow replenishment of items from the second row as indicated by reference numerals 327, 344A and 347A as described in detail with respect to FIGS. 5A–5C to which reference is now made.

Figure 5A:
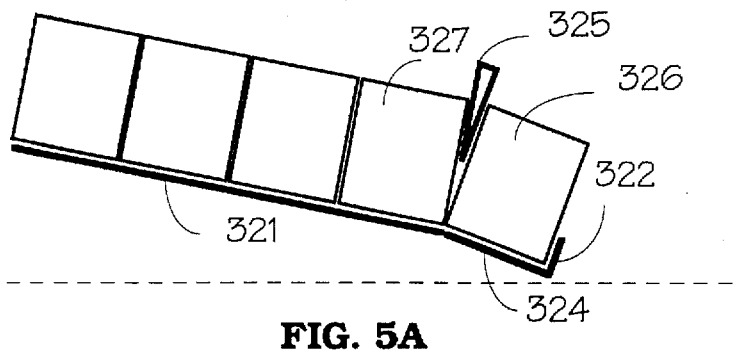
FIGS. 5A–5C are schematic pictorial side views illustrations of a row of articles on one shelf of the vending machine of FIGS. 4A–4C during the operation of the vending machine.
Figure 5B:
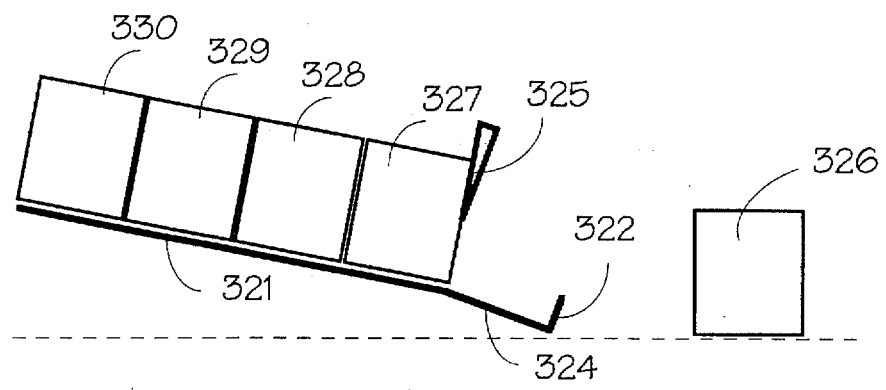
Figure 5C:
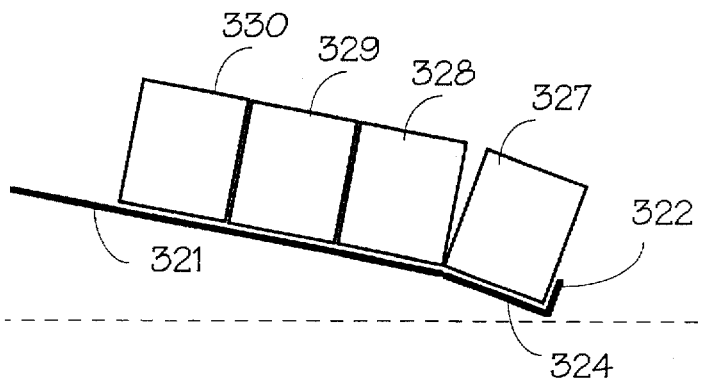

FIGS. 5A–5C illustrate a successive column of items in a portion of the shelf 321, that of the items 326–330. FIG. 5A illustrates the item 326 before it is removed, the separating member 325 is positioned between the items 326 and 327 to prevent access of the user to item 327. Once the item 326 is removed, as shown in FIG. 5B, the space 324 in the first row is left empty and the separating member 325 prevents its replenishment by item 327. Once the purchase is completed and the door 310 is closed, the separating member 325 is shifted to allow item 327 to replenish item 326 in the position 324.

It will be appreciated that with the gravitational movement of the item 327, the items 328, 329 and 330 move from their original position to the next row as well, thereby allowing to replenish the space 324 after each purchase. Preferably, but not necessarily, the front part of the shelf 321, that of the space 324 is more inclined than its back part both to enable easy removal of the items therefrom and to facilitate the movement of the separating member 325.

Figure 6A:
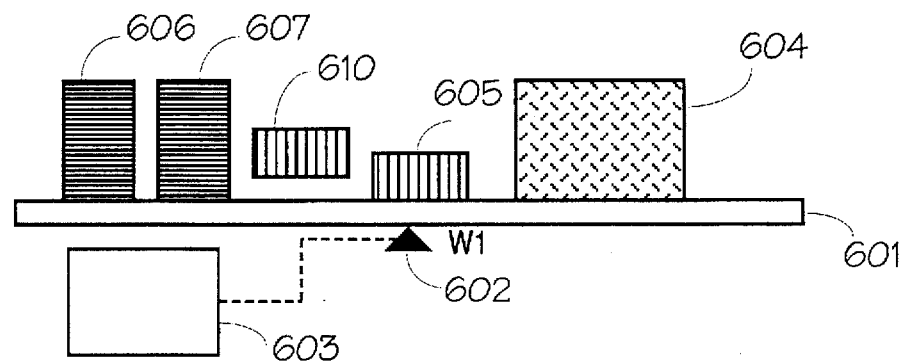
FIGS. 6A–6C are schematic pictorial illustrations of a purchase sensing unit, constructed in accordance with a preferred embodiment of the present invention.
Figure 6B:
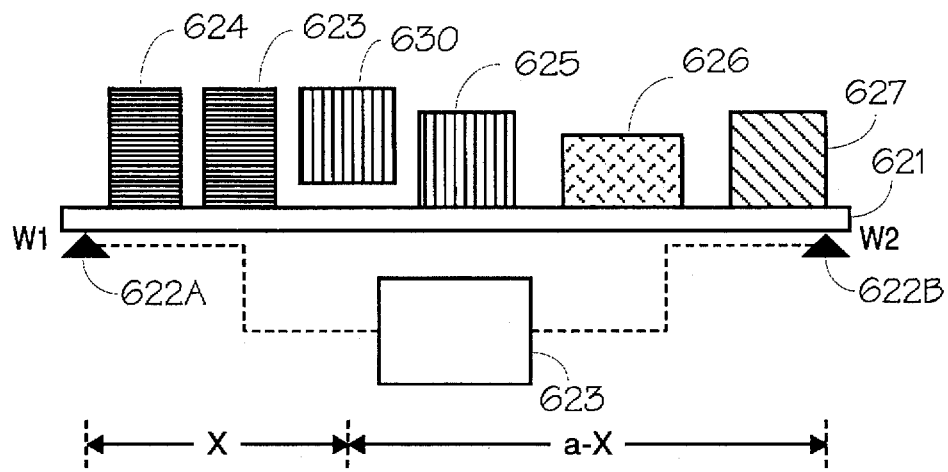
Figure 6C:
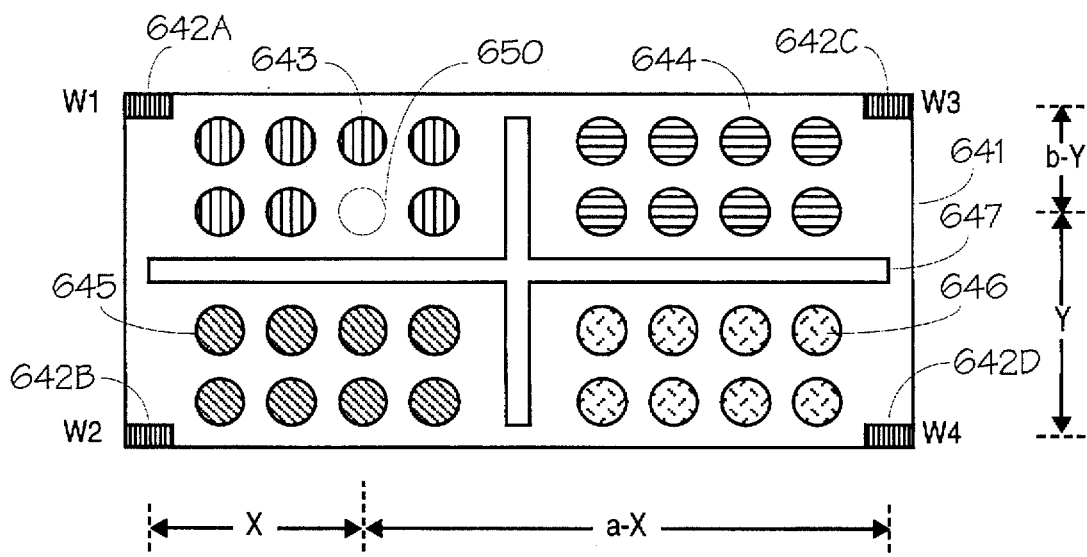

FIGS. 6A–6C are described hereinbelow with respect to any shelf having thereon any desired number of items in each position, since it is suitable for use, not only in the vending machine 300 but in any system in which the removal and the state of the inventory is to be monitored, such as in hotel mini-bar systems.

It will be appreciated that the sensing unit described with respect to FIGS. 6A–6C are particularly useful when stacking items on shelves is desirable.

FIG. 6A is a schematic pictorial cross section through a shelf 601 having a weight sensor 602, the reading of which, indicated W1, is provided to a controller 603. Five items, referenced 604, 605, 606, 607 and 610 are placed on the shelf 601, where items 606 and 607, as well as items 605 and 610, are of the same type.

When the item 610 is removed, the reading of W1 changes by $\Delta W1$. $\Delta W1$ will identify the type of article 610 if its weight is known and is different from that of the other item types represented by 604, 606 and 607.

FIG. 6B is a schematic pictorial cross section through a shelf 621 according to an alternative, improved embodiment of the present invention. The shelf 621 is preferably supported on two weight sensors 622A and 622B, measuring two respective weights W1 and W2. The distance between 622A and 622B is designated "a". On the shelf 621, a plurality of items 623, 624, 625, 626, 627 and 630 are positioned and of which items 627 and 630 are of different type but of the same weight. Therefore, the removal of an article is sensed by both its weight and position.

In the illustrated embodiment, the removal of an article, such as article 630, causes two changes $\Delta W1$ and $\Delta W2$, in the readings W1 and W2, respectively. The removal of the item 630 can be now sensed both by calculating the item's weight which equals $-(\Delta W1+\Delta W2)$, and if two items are of similar weight but of different types, also by its position, referenced X which is calculated by solving for X the equation $\Delta W1*X=\Delta W2*(a-X)$. A controller 623 computes both the weight and the position, to conclude that the article 630 is the one which has been removed.

FIG. 6C is a schematic top view of a shelf according to a third alternative embodiment of the present invention. The shelf 641 is preferably supported by four weight sensors, referenced 642A, 642B, 642C and 642D. The shelf 641 accommodates four groups of items, 643, 644, 645 and 646, of which items in groups 643 and 644 are of similar weight. Preferably, the groups 643, 644, 645 and 646 are separated by a partition 647.

When an item 650 is removed, the readings of the weight sensors 642A–642D are changed by $\Delta W1$, $\Delta W2$, $\Delta W3$ and $\Delta W4$, respectively. The weight of article 650 equals $-(\Delta W1+\Delta W2+\Delta W3+\Delta W4)$, while its position coordinates X,Y can be calculated from solving for X,Y the equation pair: $(\Delta W1+\Delta W2)*X=(\Delta W3+\Delta W4)*(a-X)$ and $(\Delta W2+\Delta W4)*Y=(\Delta W1+\Delta W3)*(b-Y)$ where "a" and "b" are the distances between the weight sensors 642B–642D and 642A–642B, respectively. The position and weight measurement provide a definite indication that the item 650 has been removed.

It is a particular feature of the present invention that the removal of an item is determined by sensing both its weight and position and not only by its weight as in prior art sensing systems.

Figure 7A:
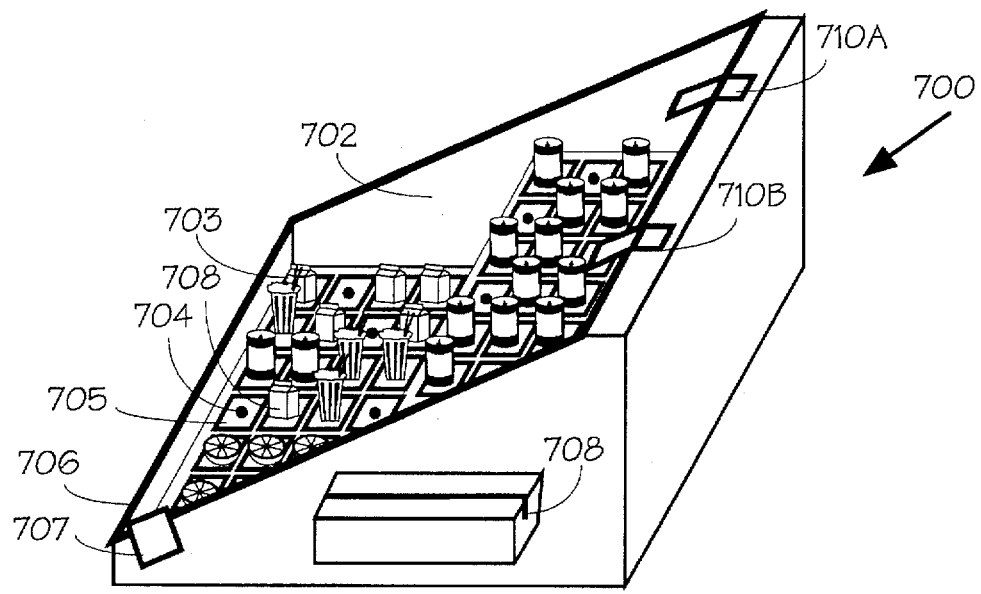
FIGS. 7A–7B are schematic pictorial illustrations of a vending machine, constructed in accordance with a second preferred embodiment of the present invention.
Figure 7B:
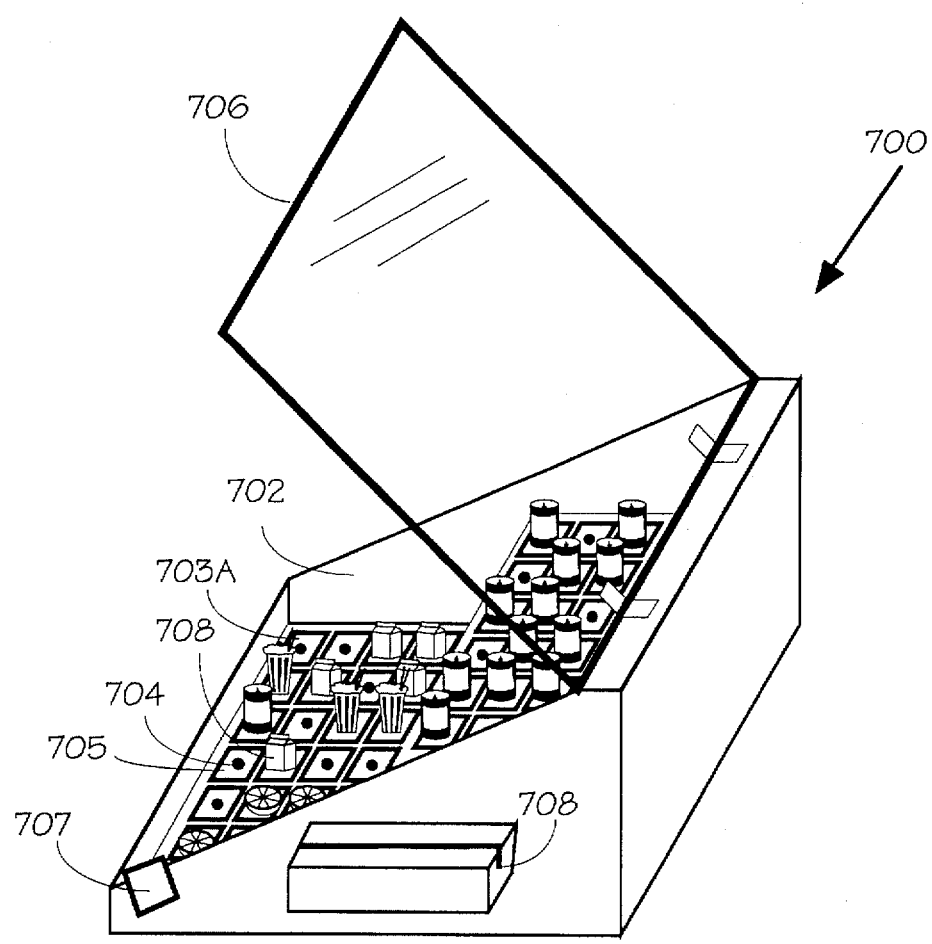

Reference is now made to FIGS. 7A and 7B which illustrate a vending machine, generally referenced 700, as a second non limiting example of the vending machine 100 (FIG. 1).

The vending machine 700 preferably comprises a chamber 702 for storing a plurality of articles 703 and a glass door 706 locked by a lock 707 which also incorporates a sensor for determining whether the door is open or shut and locked.

In the illustrated embodiment, the internal storage and display unit, referenced 702, is divided into cells 705, each cell designated to accommodate a single article of a predetermined type. Each cell also includes a sensor 704 to determine whether the cell is occupied or empty.

The vending machine 700 is particularly suitable for an environment in which the vending machine owner wishes to provide a variety of goods for sale but in which the consumption is relatively slow.

The vending machine 700 also comprises a card reader 708 which for exemplary purposes only, is different than the card reader 308 (FIG. 3A) in that it is a swipe card reader, preferably connected to a local computer (not shown), as described in detail hereinbelow with reference to FIGS. 11A–11C.

When a payment card is swiped in the card reader 708, the respective account in the local computer is checked for card validity. If the payment card is valid, the lock in 707 is released, allowing the customer to open the door 706, supported by its hinges 710A and 710B.

When the customer closes the door 706, unit 707 both re-locks the door 706 and senses that the door is re-locked, thus actuating the completion of accounting and payment, which in this example is charged through the local computer.

Reference is now made to FIGS. 8A–8C and 9 which illustrate two types of alternative purchase sensing units suitable for the vending machine 700. It will be appreciated that the purchase sensing units may also be used with any other suitable vending machine, such as the vending machine 300, mutatis mutandis.

Figure 8A:
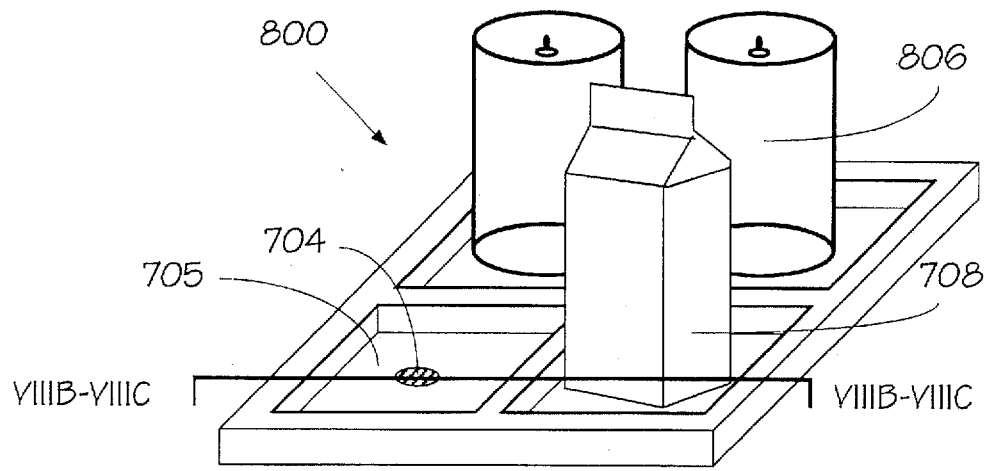
FIG. 8A is a schematic pictorial illustration of a portion of one shelf of the vending machine of FIGS. 7A–7B.
Figure 8B:
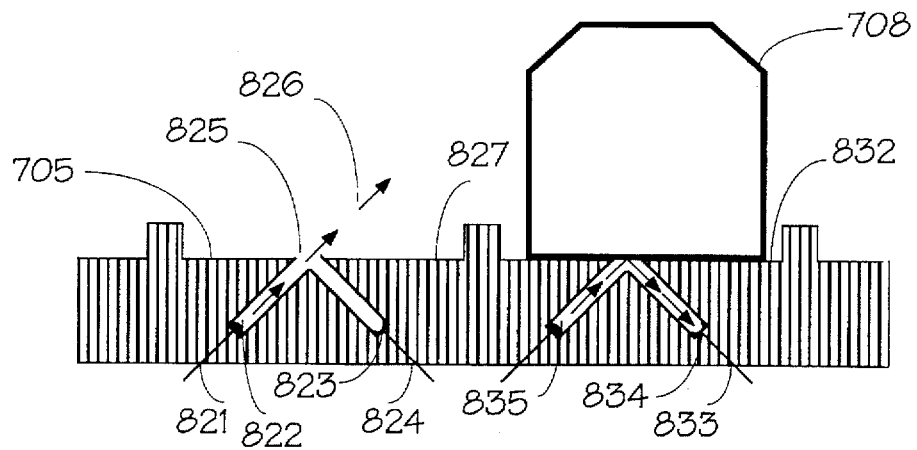
FIGS. 8B–8C are schematic pictorial side views through the portion of the shelf of FIG. 8A, illustrating two alternative purchase sensing units, constructed in accordance with a preferred embodiment of the present invention.
Figure 8C:
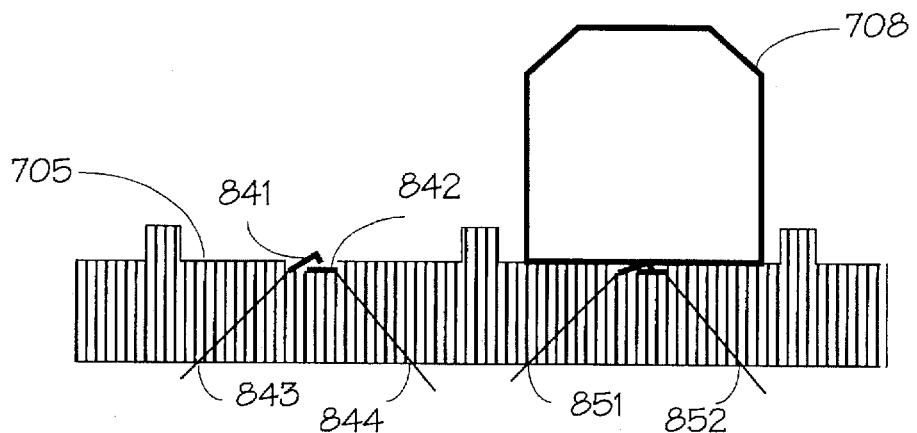

The purchase sensing unit of FIGS. 8A–8C is incorporated in the shelves of the storage and display unit 702, of which only a portion, referenced 800, is shown in FIGS. 8A–8C for exemplary purposes.

As shown in FIG. 8A, the shelf 800 is divided into distinct cells, of which one 705 is shown herein for simplicity and having therein a sensor 704. The sensor 704 may be any suitable sensor, such as an electro-optical sensor (FIG. 8B) or an electro-mechanical switch type sensor (FIG. 8C).

It will be appreciated that preferably, the location of items in the plurality of cells within the storage and display unit is predetermined in order to associate the removal of an article with a specific merchandise. Therefore, the removal of the item 806 will be easily detected and distinguished from the removal of item 708.

The electro-optical sensor (FIG. 8B) operates to distinguish between an empty cell 827, i.e. a cell from which an item has been removed, and an occupied cell 832.

In the empty cell 827, light-emitting element 822 which is energized through wire 821 emits light which is not detected by the light-sensitive element 823 since light rays 826 escape through opening 825. Therefore, no signal is transmitted through wire 824 which indicates that cell 827 is empty.

Cell 832 is occupied by an article 831, which reflects the light energized by wire 835, the reflected light is sensed by light-sensitive element 834 which, in turn, transmits a signal through wire 833 to indicate that cell 832 is occupied. However, if item 708 will be removed from cell 832, the removal will be indicated by the cease of the signal transmitted from 833.

In the electro-mechanical switch type sensor (FIG. 8C), wires 843 and 844 are disconnected because contacts 841 and 842 are open as a result of a removal of an item, while wire 851 and 852 are connected because the respective contacts are closed by the weight of an article which occupies the cell.

Figure 9:
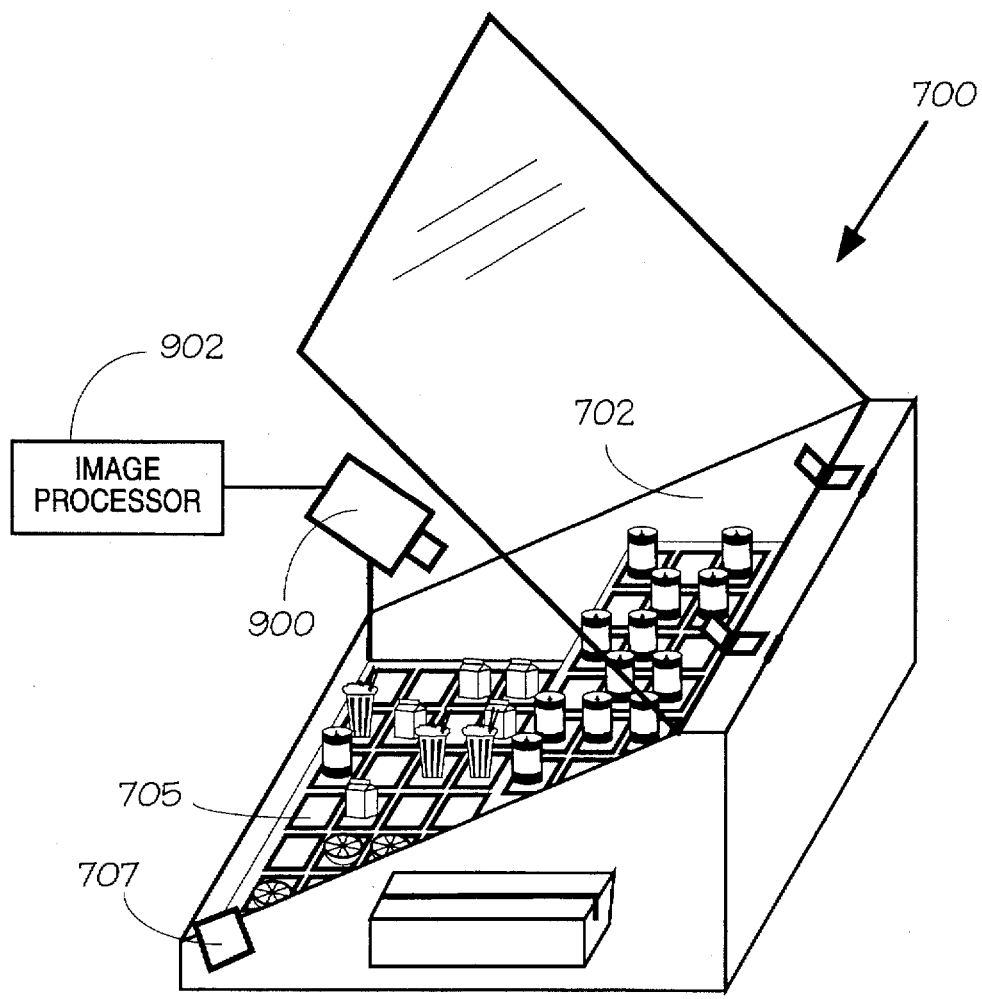
FIG. 9 is a schematic pictorial illustration of the vending machine of FIG. 7A–7B with a video purchase sensing unit.

Reference is now made to FIG. 9 which illustrates an alternative purchase sensing unit 104 to that of FIGS. 8A–8C.

In the embodiment of FIG. 9, a video camera 900 is used as the purchase sensing unit. The video camera 900 acquires continuously the image of the articles present in the storage and display unit 702, hence detecting changes in the recorded image both before and after each purchase and during the purchase. An image processor 902 is used to compare between successive images, thereby detecting changes therebetween and providing an indication of the cells from which items have been removed.

It will be appreciated that an advantage of the embodiment of FIG. 9 is that the using a video camera 900 eliminates the need to use individual sensors in each one of the cells, such as in cell 705.

Further, it will be appreciated that by applying image processing techniques which are well known in the art, the image processor 902 can identify the type of the removed article by any visible characteristic, such as its size, shape, color or markings, collectively referred to herein as the item's pattern.

Reference is now made to FIGS. 10A–11C which illustrate two alternative card payment units, constructed in accordance with the preferred embodiments of the present invention, in which the card payment unit is capable of charging effectively the customer with any amount from zero up to the maximal possible purchase value. Also, the card payment unit checks before the onset of a purchase only whether the payment card can be charged with the maximal possible purchase value, whereas charging is done after the completion of the purchase in accordance with the value of the items which have been removed from the storage and display unit.

It will be appreciated that while the operation of the card payment unit of FIGS. 10A–11C is described with reference to the card payment unit 103 of the vending machine 100, it is also intended for any other suitable vending machine, such as the vending machines 300 and 700.

Figure 10A:
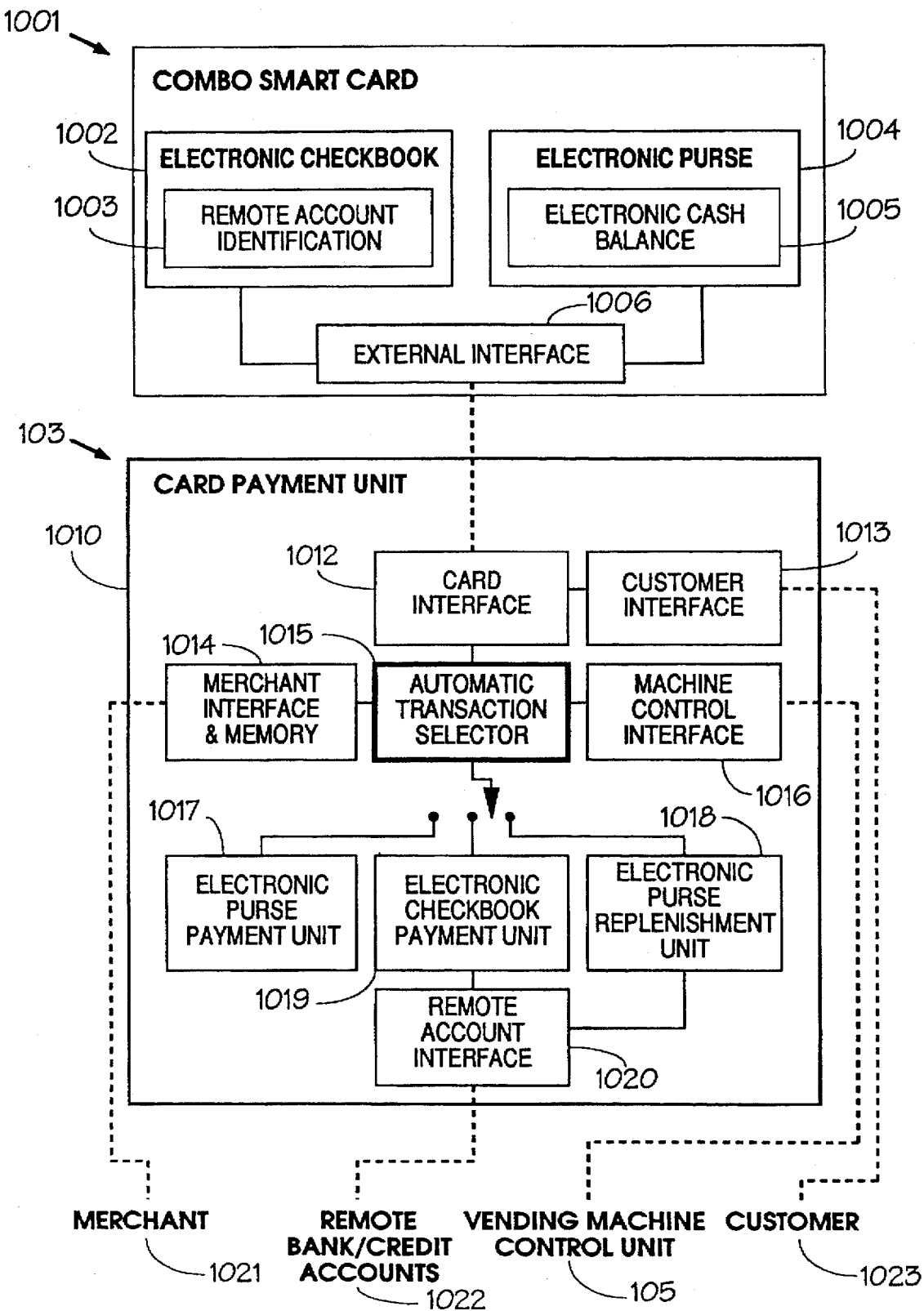
FIG. 10A is a schematic block diagram illustration of a card payment unit operative with a combo smart card, constructed in accordance with a preferred embodiment of the present invention.

Reference is now made specifically to FIG. 10A which is a block diagram illustration of a card payment unit which operates with a combo smart card generally referenced 1001.

The combo smart card 1001 comprises an electronic checkbook 1002 and an electronic purse 1004. The electronic checkbook contains in its register 1003 information identifying and authorizing transactions with at least one remote bank or credit card account. The electronic purse maintains in its register 1005 the balance of the electronic cash stored therein.

The payment card 1001 preferably also includes an external interface 1006 which enables to use it for three types of transactions, namely, payment via the electronic checkbook 1002, payment via the electronic purse 1004 and replenishment of the electronic purse 1004 from a remote account via in the electronic checkbook 1002.

The card payment unit 103 comprises a card interface 1012 for communicating with the combo smart card 1001. In addition, the card payment unit 103 preferably also comprises means for retaining the payment card during purchase and for releasing it after the transaction for the purchase has been completed.

The card payment unit 103 preferably also comprises a customer interface 1013, such as a display and a keypad, for allowing the customer to add information, such as a personal identification number (PIN) or to select a specific remote account, if more than one remote account is accessible by the electronic checkbook 1002.

The card payment unit 103 preferably also comprises an interface with the merchant 1014, i.e an interface for receiving from the vending machine owner or operator which is schematically indicated by reference numeral 1021, input such as the minimal checkbook transaction value or payment card validation criteria.

The card payment unit 103 also comprises a machine control interface 1016 for connecting between the payment unit 1010 and the machine control unit 105, for disabling the access-control unit 106 upon receiving a valid payment card, and for reporting the purchase sum from the accounting unit 108 upon the completion of the purchase.

The card payment unit 103 also comprises a transaction selector 1015 which selects automatically the proper transaction sequence in response to the payment sum, the balance in the electronic purse and the minimal sum allowed for electronic checkbook transactions, as described in detail with reference to FIG. 10B. The transaction selector 1015 selects in accordance with the transaction sequence, one of the payment units, namely, an electronic purse payment unit 1017, an electronic checkbook payment unit 1019 and an electronic purse replenishment unit 1018. It will be appreciated that a transaction directed to the electronic purse replenishment unit involves a sequence of transactions as described hereinbelow.

The electronic purse payment unit 1017 executes payment transaction from the electronic purse 1004. Similarly, the electronic checkbook payment unit 1019 executes payment transactions from a remote bank and/or credit account accessible by the electronic checkbooks 1002, optionally using additional information provided by the customer 1023, such as the secret PIN code, so as to enhance the security of the transaction. The electronic purse replenishment unit 1018 executes replenishment of the electronic purse 1004 by charging a remote bank and/or credit account accessible by the electronic checkbook 1002, with or without additional information provided by the customer 1023. Remote account interface 1020 includes the means necessary to communicate with transaction processing centers of banks and credit companies 1022, for example with respect to account information received from register 1003 of a valid customer payment card.

Figure 10B:
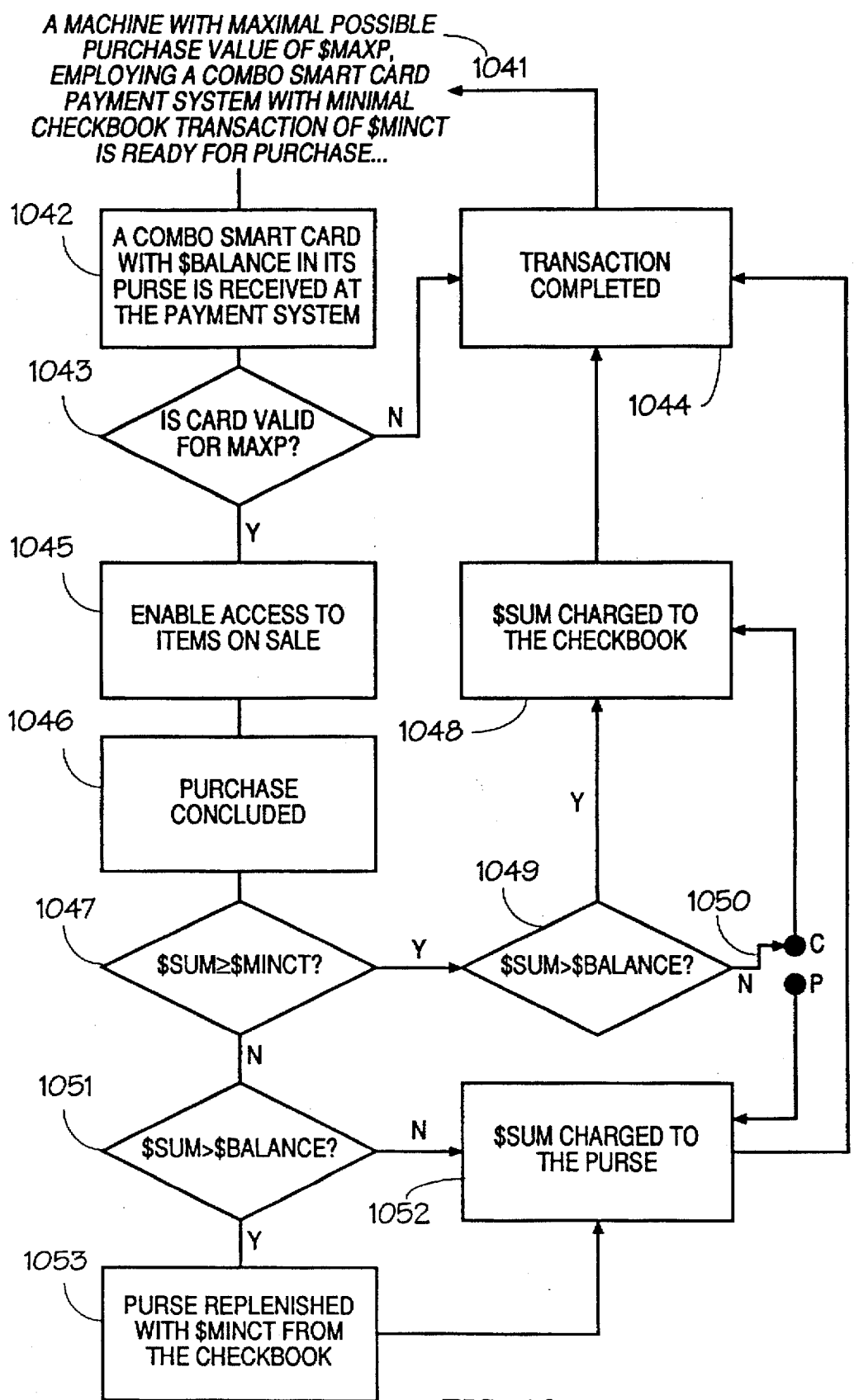
FIG. 10B is a schematic flow chart illustration of the operation of the card payment unit of FIG. 10A.

FIG. 10B is a flow chart illustrating the transaction procedure employed with the card payment unit 103 of the vending machine 100.

In its idle state 1041, the vending machine 100 is ready for a purchase to be made by the customer.

In 1042, the combo smart card 1001 currently containing a value designated by $BALANCE in its electronic purse 1004, is received at the payment unit 103 and retained therein by card interface 1012. The information stored in the payment card is read by the card interface 1012, and if appropriate, the customer is prompted to key-in his PIN code and select the remote bank or credit account if more than one remote account is accessible by the combo smart card 1001.

In block 1043, a validity check is performed for determining whether the payment card is valid and whether it can be charged after the purchase has been completed for the maximal possible purchase value, the value of the accessible inventory.

The criteria of the validity check 1043 are programmed into the transaction selector, preferably, but not necessarily, by the merchant 1021.

According to a preferred embodiment of the present invention, the validity check includes communicating the bank or credit card company to which the electronic checkbook is related, for checking whether the remote account may be charged via the payment card for the maximal possible purchase value, i.e. the value of the entire accessible inventory.

Alternatively, an off-line validity check may be allowed, counting on additional security measures, such as requiring the customer to enter a PIN code, or checking a red list of lost and stolen cards routinely received from banks and credit companies and maintained at the payment unit.

According to one embodiment of the present invention, the merchant 1021 may undertake part of the risk from the card issuer and therefore the on-line or off-line check with the bank or credit company will be for only part of the maximal possible purchase value. For example, a customer keying-in a valid PIN code and whose card is not found in the red list may get free access to an inventory worth $100, even if the respective card issuer bears responsibility only for a $50 off-line transaction.

It will be appreciated that risk sharing between banks or credit companies and merchants is a common practice and typically depends on factors such as customer behavior and the merchant's willingness to trade-off a calculated risk for improved, more efficient service to the customer.

If the validity check ends up with a negative result, the payment card is returned to the customer as indicated in 1044 by card interface 1012, and the machine is ready for the next purchase (block 1041). An indication to this effect may appear on the customer interface 1013.

If the payment card is found valid as described with reference to block 1043, step 1045 is performed, namely, the payment unit 1010 signals the machine control unit to disable the access control unit 106 so that the customer receives free access to the storage and display unit 102 and may purchase any desired items from the accessible inventory as described hereinabove.

In 1046, the purchase for a sum referenced $SUM is concluded by purchase termination unit 107 and calculated by the accounting unit 108. The sum $SUM is provided to the card payment unit 103, and the automatic transaction selector 1015 then selects automatically the payment unit from which the payment for the purchase $SUM will be collected.

In 1047 $SUM is compared to $MINCT to determine whether a checkbook payment is feasible. If the answer is positive then, as indicated in block 1049 $SUM is compared with $BALANCE to determine whether a purse transaction is feasible as well. If the electronic purse transaction is also feasible a selection which transaction to execute is provided as indicated by 1050. The transaction can be executed either way, so a switch is provided to direct the transaction either to the checkbook payment unit 1019 as indicated by block 1048 or the purse payment unit 1017 as indicated by block 1052. The switch setting to C or P position is either predetermined by the merchant 1021 through the merchant interface and memory 1014, or is made selectable by the customer during purchase through customer interface 1013.

If the answer in 1047 is negative, i.e. the payment has been found unfeasible for checkbook payment, it is checked for purse payment feasibility as indicated in block 1051. In block 1052 the payment is found feasible through the purse, i.e. $SUM is smaller or equal to $BALANCE, and therefore payment is executed through the purse payment unit 1017.

However, if $SUM is larger than $BALANCE, the electronic purse has to be replenished and as indicated by block 1053, the electronic purse is replenished with at least the sum of $MINCT from the checkbook through unit 1018, and only then purse payment is executed in 1052. As the check in 1047 has already confirmed that in 1053 $SUM<$MINCT, this ensures that purse payment is positively feasible in 1052 after purse replenishment with at least $MINCT in 1053.

It will be appreciated that the user interface 1013 may indicate that an amount of at least $MINCT must be replenished and allow the customer to select a sum larger than $MINCT, e.g. for increasing the amount of electronic cash in his combo smart card.

When payment is completed, either in 1052 or 1048, the transaction is completed as indicated by block 1044, the combo smart card 1001 is returned to the customer and the vending machine 100 is ready for the next customer, as indicated by block 1041

Figure 11A:
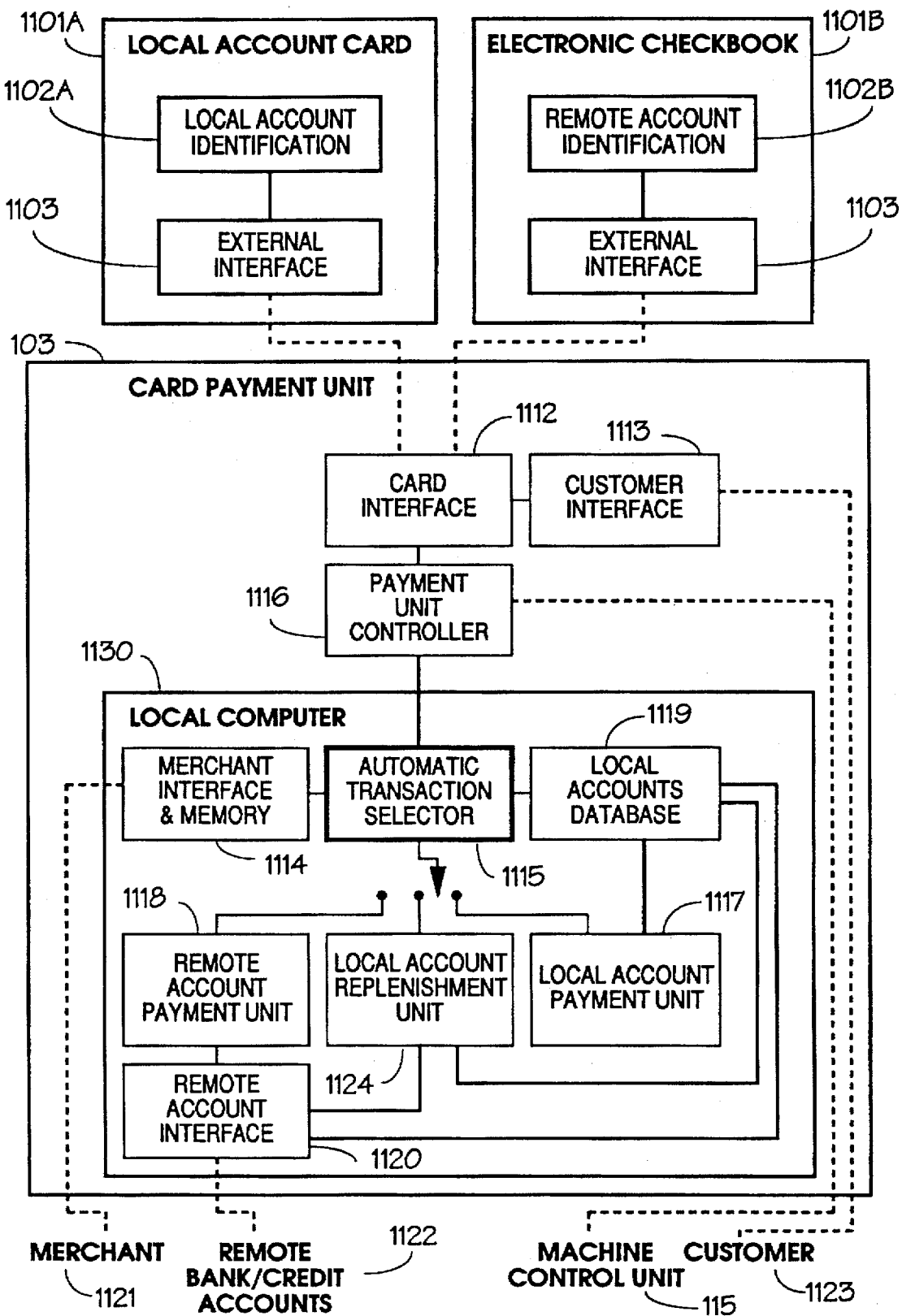
FIG. 11A is a schematic block diagram illustration of a card payment unit operative with a local account card or with an electronic checkbook, constructed according to a second preferred embodiment of the present invention.

FIG. 11A illustrates a card payment unit 103 which is particularly suitable for local environments, for serving customers within the boundaries of a local communication network. It is particularly useful in workplaces, universities, member clubs or residential neighborhoods. It will be appreciated that the card payment system of FIGS. 11A–11C does not require the use of a smart card.

According to one preferred embodiment of the present invention the card payment unit 103 of FIG. 11A includes a local account data base 1119 maintained in a local computer 1130 which forms part thereof.

In accordance with an alternative embodiment of the present invention (FIG. 11C), the card payment units of more than one vending machine form with a local computer connected thereto a card payment system.

The local computer 1130 comprises a local account data base 1119 wherein customer's local accounts are maintained.

In FIG. 11A, the card payment unit 103 receives payment cards which identify and authorize transactions with both a local account managed in the local computer 1130 and a remote bank or credit card account. In the illustrated embodiment such a payment card may be either the local account card 1101A provided with a link to a remote bank or credit account, or the electronic checkbook 1101B provided with a link to a local account.

If a local account card 1101A is to be used with the card payment unit of FIG. 11A, his owner preferably signs a contract with the merchant, identifying and authorizing access to a remote bank or credit account of the customer, for payment and replenishment transactions as described in detail hereinbelow. The information required in order to use the customer's remote account is recorded in the respective local account in the database 1119 of the local computer 1130.

If an electronic checkbook 1101B is to be used with the card payment unit of FIG. 11A, the procedure described in U.S. Pat. No. 5,206,488 to Teicher is preferably applied to allow the customer to use his electronic checkbook 1101B to establish and use a local account in the local account database 1119.

Both the local account card 1101A and the electronic checkbook 1101B include an external interface 1103 which allows them to interface with the card payment unit 103 through a card interface 1112.

The card payment unit 103 preferably also comprises a customer interface 1113, such as a display and a keypad, to allow the customer to input information such as his payment card's PIN, and a payment unit controller 1116 for coordinating between payment executed at local computer 1130 and the control unit 105 of the vending machine 100.

The local computer 1130 includes a merchant interface and memory 1114 allowing the merchant, i.e. the vending machine owner or operator, schematically referenced 1121 to input and store information, such as the minimal transaction size and the payment card validation criteria. The local computer 1030 also comprises a transaction selector 1115 which selects automatically the type of transaction in response to the payment sum, the balance in the local account and the minimal sum allowed for remote account transactions, as described in detail with reference to FIG. 11B hereinbelow.

The transaction selector 1115 selects whether a transaction will be conducted via a local account payment unit 1117, a remote account payment unit 1118 or via the local account replenishment unit 1124. It will be appreciated that a transaction conducted via the local replenishment unit 1124 involves a sequence of transactions as described hereinbelow.

The local account payment unit 1117 executes payment transactions from the respective local account in local account database 1119. It will be appreciated that in order to register in the data base 1119 a customer using a local account card, such as the payment card 1101A, identifies and authorizes transactions with his remote bank or credit account and the information required for such transactions is stored in the respective database record in 1119.

The remote account payment unit 1118 executes payment transactions with remote bank and/or credit accounts in 1122, with or without additional information provided by customer 1123. The local account replenishment unit 1124 includes the hardware, protocols and security means needed to execute replenishment of a local account in 1119 by payment from a remote bank and/or credit account, schematically referenced 1122 via a remote account interface 1120.

Figure 11B:
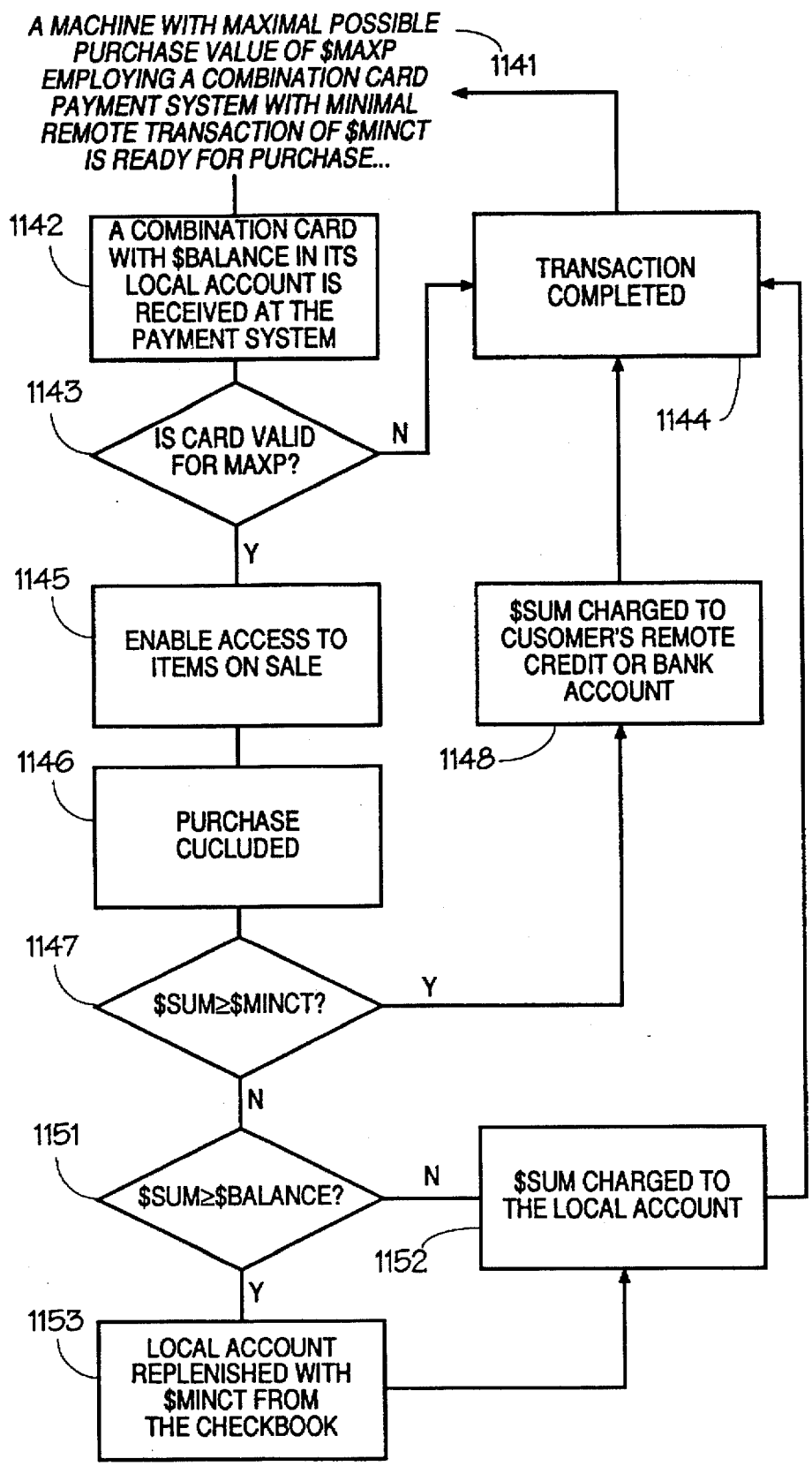
FIG. 11B is a schematic flow chart illustration of the operation the card payment unit of FIG. 11A.

FIG. 11B describes the transaction procedures involved in using either of the payment cards of FIG. 11A. In its idle state referenced 1141, the vending machine 100 having a maximal possible purchase value $MAXP provided by the merchant 1121 is ready for a purchase to be made.

In step 1142, the local account card 1101A or the electronic checkbook 1101B is received by the card payment unit 103. It will be appreciated that the payment card can be retained in the card payment unit as described with reference to the vending machine 300, or may be swiped therethrough as described with reference to the vending machine 700.

Then, the payment card is checked for its validity as indicated by block 1143, similarly to the validity check described in block 1043 (FIG. 10B) and if the payment card is found valid, the access control unit 106 is activated to enable access to the items in the storage and display unit 102 as indicated by block 1045.

It will be appreciated that the vending machines which operate with the card payment unit 103 of FIG. 11A, are particularly suitable for well defined environments, such as a work place or a university campus, in which the customers are known. Therefore, the merchant may afford taking a relatively high part of the risk in the validity check relatively to the risk taken by the bank or credit company.

After the purchase is concludes as indicated by block 1046, a decision as to how the customer will be charged is made.

In block 1147, similarly to block 1047 (FIG. 10B), the payment unit controller 1116 checks whether $SUM is larger or equal to $MINCT.

If $SUM is equal to or larger than $MINCT, $SUM is charged from the customer's remote bank or credit account identified via the local account in the data base 1119 or via the electronic checkbook 1101B as indicated by block 1148.

If $SUM is smaller than $MINCT, i.e. the payment is found unfeasible for checkbook payment, it is checked for feasibility of payment from the local account as indicated by block 1151. In block 1152 the payment is found feasible from the local account, and therefore is executed through the local account payment unit 1117. In 1153 the payment is found unfeasible for local account payment, and therefore the local account is replenished at least with the sum of $MINCT from the respective bank or credit account through unit 1118, followed by executing a local account payment, as indicated in 1152.

It will be appreciated that since the check in block 1147 has confirmed that in 1153 $SUM is smaller than $MINCT, the payment from the local account indicated by block 1152 is guaranteed after replenishment with at least the sum of $MINCT as indicated by 1153.

When payment is completed, either in 1148 or 1152, the transaction is completed as indicated by block 1144, the payment card is returned to the customer if a card payment unit similar to 308 (FIG. 3A) is used and the vending machine 100 is ready for the next purchase as indicated by 1141.

According to another preferred embodiment of the present invention, local credit in the local account may be granted to the customers, either by the merchant or by the bank or credit company.

Local credit will reduce the number of transactions with the remote bank or credit account as evident from the following example. If a credit of $25.00 is granted and $MINCT is $25.00, transaction equal to or greater than $50.00 will be executed via block 1148 while smaller transaction will be executed via block 1151. The transaction selection criteria of block 1147 and 1151 will be adjusted accordingly, by allowing in 1147 $SUM to be compared to. $MINCT+$CREDIT, and in 1151 to be compared with $BALANCE+$CREDIT, and by replenishment in 1153 with $MINCT+$CREDIT, where $CREDIT is the credit granted to the respective local account.

Figure 11C:
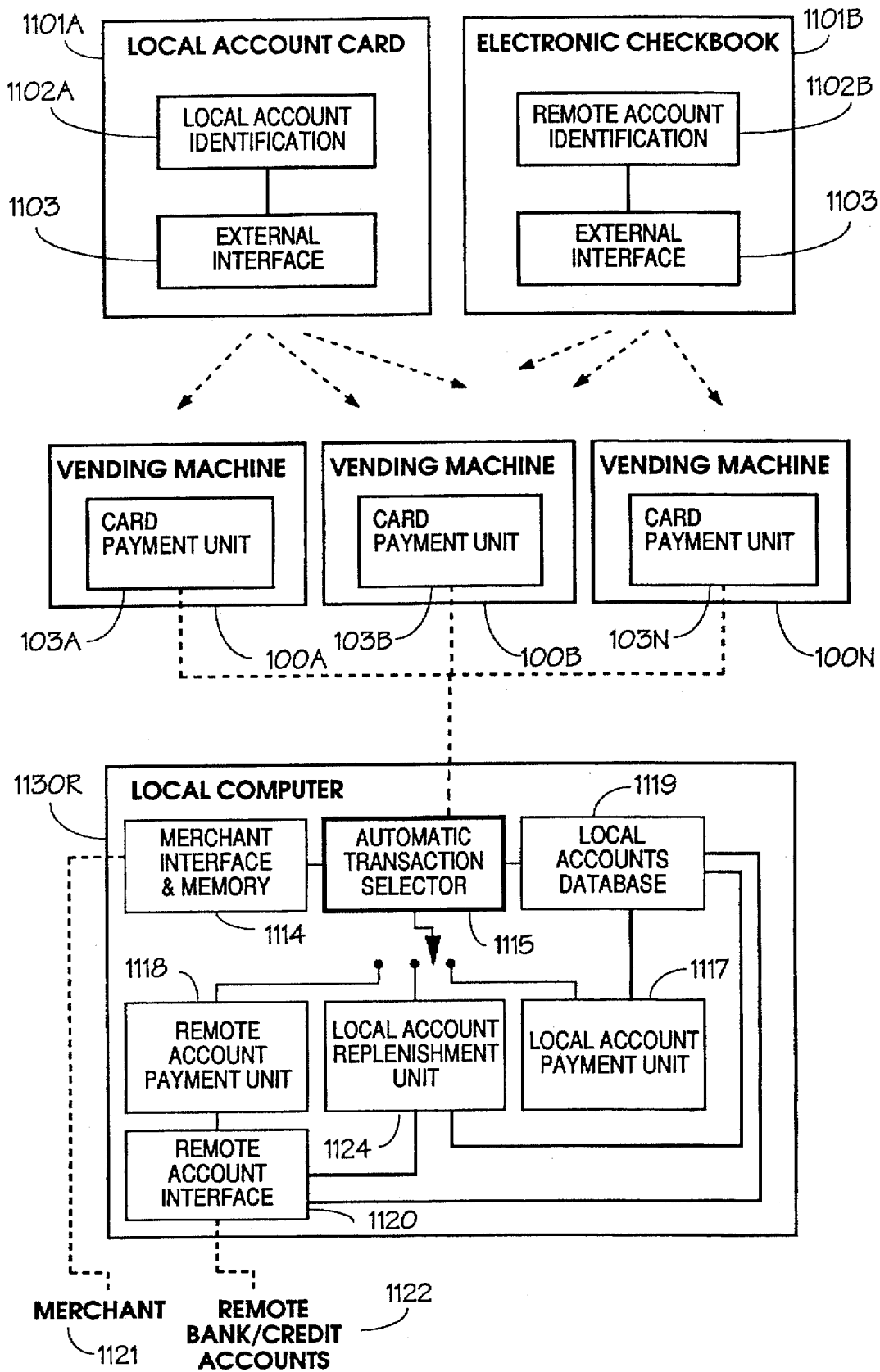
FIG. 11C is a schematic block diagram illustration of the a card payment system operative with a local account card or with an electronic checkbook, constructed according to a preferred embodiment of the present invention.

The system illustrated in FIG. 11C provides a vending system which includes a plurality of vending machines and a single local computer 1130R capable of communicating with a plurality of vending machines connected thereto by any suitable communication method.

In the illustrated embodiment, three card payment units 103A, 103B and 103N of three different vending machines 100A, 100B and 100N, respectively are connected to a single local computer 1130R.

The local computer 1130R is similar to the local computer 1130 of FIG. 11A, provides similar functions and operates in a similar fashion to the card payment units 103 (FIG. 11A) as described with respect to FIG. 11B.

It will be appreciated that the three vending machines illustrated in FIG. 11C are for exemplary purposes only and that any desired number of vending machines may be connected to the local computer 1130R. For each vending machine, such as the vending machine 100A, the local computer 1130R operates with its card payment system 103A as described in detail with respect to FIG. 11B hereinabove.

It will be appreciated that the preferred embodiments described hereinabove are described by way of example only and that numerous modifications thereto, all of which fall within the scope of the present invention, exist. For example, the vending machine 100 may incorporate the local computer 1130.

Another example is that any of the transactions described hereinabove may be off-line or on-line transactions. If desired, the transactions may be recorded in a local memory (not shown) of any of the vending machines, such as the vending machine 100 and may be executed, for example in order to save communication costs, as a daily batch to the appropriate central transactions system of the banks or the credit companies involved.

Another example is to employ the inventory splitting unit to facilitate the replenishment of the inventory in a desired fashion. If the inventory includes a plurality of pre-packaged boxes of identical items as part thereof, the inventory splitting unit may allow access to items from one box first, and only when the items from this box are removed, access to the next box will be allowed. This way, replenishment of the inventory can be done by whole pre-packaged boxes instead of by single items.

It will be appreciated by persons skilled in the art that the present invention is not limited to what has been particularly shown and described hereinabove. Rather, the scope of the present invention is defined only by the claims that follow:

I claim:

1. A vending machine offering for sale at least two different items, at least one item being a low cost item, to a plurality of customers each having a payment card, said payment card being operative to pay from both a local account and a remote account, said remote account being unsuited for payment of said low cost item, said vending machine comprising:

a vending unit for storing an accessible inventory of said at least two items and for selectively enabling and barring free access of a customer to said accessible inventory; and a card payment unit cooperating with said vending unit, which upon receipt of said payment card, validates, prior to said enabling, that said payment card can charge said remote account for the value of said accessible inventory, and which, after said barring, receives from said payment card a payment sum in accordance with the price of the items removed from said accessible inventory, by automatically selecting, according to said payment sum and the status of said local account, whether:

to receive said payment sum from said local account; or to receive said payment sum from said remote account; or to both replenish said local account from said remote account and receive said payment sum from said local account.

2. A vending machine according to claim 1 wherein said vending unit comprises:

a storage and display unit having therein said accessible inventory;

an access control unit for enabling and barring said free access of said customer to said storage and display unit; and a purchase sensing unit for sensing the removal of each item from said accessible inventory stored in said storage and display unit.

3. A vending machine according to claim 2 wherein said purchase sensing unit is selected from the group consisting of a plurality of position sensing elements, a plurality of weight sensing elements, a pattern sensing element and any combination therebetween.

4. A vending machine according to claim 2 wherein said access control unit comprises a door with a locking mechanism for selectively barring and enabling access to said storage and display unit.

5. A vending machine according to claim 2 wherein said storage and display unit also has therein an inaccessible inventory of a second plurality of items, said access control unit further comprising an inventory splitting unit for barring access to said second plurality of items of said inaccessible inventory.

6. A vending machine according to claim 5 wherein said inventory splitting unit is operable to selectively replenish said accessible inventory with items from said inaccessible inventory.

7. A vending machine according to claim 1 wherein said payment card is a combo smart card, said local account is charged from an electronic purse of said combo smart card and said remote account is charged via an electronic checkbook of said combo smart card.

8. A vending machine according to claim 7 and wherein said card payment unit comprises an electronic checkbook payment unit for executing electronic checkbook transactions, an electronic purse payment unit for executing electronic purse transactions and an electronic purse replenishment unit for replenishing said electronic purse from said remote account via said electronic checkbook.

9. A vending machine according to claim 1 wherein said card payment unit also comprises a computer for managing a plurality of said local accounts.

10. A vending machine according to claim 1 wherein said card payment unit communicates with a local computer, external to said vending machine, and said local computer validates, receives said payment sum and at least partially replenishes said local account instead of said card payment unit.

11. A vending machine offering for sale at least two items, at least one item being a low cost item, to a plurality of customers, each having a payment card, said payment card being operative to pay from both a local account and a remote account, said remote account being unsuited for payment of said low cost item, said vending machine comprising:
 a vending unit for storing an accessible inventory of said at least two items and for selectively enabling and barring free access of a customer to said accessible inventory; and
 a card payment unit cooperating with said vending unit, which upon receipt of said payment card, validates, prior to said enabling, that said payment card can charge said remote account for the value of said accessible inventory, and which, after said barring, receives from said payment card a payment sum in accordance with the items removed from said accessible inventory, by automatically selecting, according to said payment sum and the status of said local account, whether:
  to receive said payment sum from said local account; or
  to both replenish said local account from said remote account and receive said payment sum from said local account.

12. A vending machine offering for sale at least two items, at least one item being a low cost item, to a plurality of customers, each having a card operative to pay from the value stored in its electronic purse and to charge at least one remote account via its electronic checkbook, said remote account being unsuited for payment of said low cost item, said vending machine comprising:
 a vending unit for storing an accessible inventory of said at least two items and for selectively enabling and barring free access of a customer to said accessible inventory; and
 a card payment unit cooperating with said vending unit, which upon receipt of said card and prior to said enabling, checks the validity of said card, and which, after said barring, receives from said card a payment sum in accordance with the items removed from said accessible inventory, by automatically selecting, according to said payment sum and said value stored in its electronic purse, whether:
  to receive said payment sum from said electronic purse; or
  to charge a remote account for said payment sum via said electronic checkbook; or
  to both replenish said electronic purse by charging a remote account via said electronic checkbook, and receive said payment sum from said electronic purse.

13. A vending machine offering for sale at least two items, at least one item being a low cost item, to a plurality of customers, each having a combo smart card having an electronic purse and an electronic checkbook operative to pay from the value stored in its electronic purse and to charge at least one remote account via its electronic checkbook, said vending machine comprising:
 a vending unit for storing an accessible inventory of a plurality of items, and for selectively enabling and barring free access of a customer to said accessible inventory; and
 a card payment unit cooperating with said vending unit, comprising:
  (a) an electronic purse payment unit operative to receive payment from said electronic purse; and
  (b) an electronic purse replenishment unit operative to replenish said electronic purse by charging said at least one remote account via said electronic checkbook;
 said card payment unit being operative, after said barring of said free access, to receive from said combo smart card a payment sum in accordance with the items removed from said accessible inventory, by automatically selecting whether:
  to receive said payment sum from said electronic purse; or
  to charge a remote account for said payment sum via said electronic checkbook; or
  to both replenish said electronic purse by charging a remote account via said electronic checkbook, and receive said payment sum from said electronic purse.

14. A method of operating a vending machine offering for sale at least two items, at least one item being a low cost item, to a plurality of customers, each having a payment card, said payment card being operative to pay from both a local account and a remote account, said remote account being unsuited for payment of said low cost, said vending machine having a vending unit for selectively enabling and barring free access to a plurality of items from an accessible inventory stored therein, and a card payment unit cooperating with said vending unit, the method comprising:

introducing said payment card in said card payment unit;

checking the validity of said payment card;

upon successful validation of said payment card, enabling free access of said customer to said accessible inventory;

sensing and recording each item removed from said accessible inventory;

barring, upon indication from said customer, said free access; and receiving a payment sum from said payment card for the value of the items removed from said vending unit by automatically selecting, according to said payment sum and the status of said local account, whether:

to receive said payment sum from said local account; or to receive said payment sum from said remote account; or to both replenish said local account from said remote account and receive said payment sum from said local account.

15. A method according to claim 14 wherein said payment card is a combo smart card and said local account is the electronic purse of said combo smart card, further comprising charging said remote account via an electronic checkbook of said combo smart card.

16. A method according to claim 14 wherein said vending unit also operates for storing an inaccessible inventory of items, further comprising selectively replenish said accessible inventory by items from said inaccessible inventory.

* * * * *